(12) United States Patent
Li et al.

(10) Patent No.: US 7,459,408 B2
(45) Date of Patent: Dec. 2, 2008

(54) $AL_2O_3$ DISPERSION-STRENGTHENED $TI_2ALN$ COMPOSITES AND A METHOD FOR PRODUCING THE SAME

(75) Inventors: Juying Li, Liaoning (CN); Yuyou Cui, Liaoning (CN); Rui Yang, Liaoning (CN)

(73) Assignee: Institute of Metal Research, Chinese Academy of Sciences, Liaoning (CN)

( * ) Notice: Subject to any disclaimer, the term of this patent is extended or adjusted under 35 U.S.C. 154(b) by 14 days.

(21) Appl. No.: 11/629,559

(22) PCT Filed: Jul. 15, 2005

(86) PCT No.: PCT/CN2005/001048

§ 371 (c)(1),
(2), (4) Date: Dec. 14, 2006

(87) PCT Pub. No.: WO2006/005267

PCT Pub. Date: Jan. 19, 2006

(65) Prior Publication Data

US 2007/0179040 A1     Aug. 2, 2007

(30) Foreign Application Priority Data

Jul. 15, 2004    (CN)    ......................... 2004 1 0020970

(51) Int. Cl.
*C04B 35/58*    (2006.01)
*C04B 35/582*    (2006.01)

(52) U.S. Cl. .................... 501/98.6; 501/96.1; 501/98.4; 264/647; 264/659

(58) Field of Classification Search ................ 501/98.6, 501/96.1, 98.4; 264/647, 659
See application file for complete search history.

(56) References Cited

U.S. PATENT DOCUMENTS 5,328,875 A    7/1994    Ueda et al.

(Continued)

FOREIGN PATENT DOCUMENTS

GB    2320726    7/1998

(Continued)

OTHER PUBLICATIONS

Hans Nowotny, "Strukturchemie Einiger Verbindungen der Übergangsmetalle Mit Den Elementen C, Si, Ge, Sn" *Prog. Solid State Chem.*, 2, 27 (1970).

(Continued)

*Primary Examiner*—Karl E Group
(74) *Attorney, Agent, or Firm*—Knobbe, Martens, Olson & Bear, LLP

(57) ABSTRACT

The invention provides $Al_2O_3$ dispersion-strengthened $Ti_2AlN$ composites, wherein $Ti_2AlN$ matrix and $Al_2O_3$ strengthening phase both are reactively formed in situ. The volume fraction of $Al_2O_3$ is 5% to 50%; the particle size of $Al_2O_3$ ranges from 500 nm to 2 μm, with the mean size of $Al_2O_3$ particles about 0.8 μm to 1.2 μm; the shape of $Ti_2AlN$ grain is plate-like about 80 nm to 120 nm thick and 0.5 μm to 2 μm long. The composites exhibit excellent deformability at high temperature under compression and flexure stresses, and possess excellent oxidation resistance at 1100° C. to 1350° C. for long time (100 h). The composites show typical metallic conductor behavior and the electrical resistivity at room temperature is 0.3 to 0.8 μΩ·m. The invention also provides a method for preparing the same: First, nanoparticles in Ti—Al binary system were prepared in continuous way by hydrogen plasma-metal reaction (HPMR) using Ti—Al alloy rods with Al content 20% to 60% by atom, or pure Al rods and pure Ti rods. The atmosphere used in HPMR is the mixture atmosphere of nitrogen-containing gas, $H_2$ and Ar, with total pressure of 0.8 to 1.2 atm, wherein volume ratio of $H_2$ and Ar is 1:0.8-1.2, and volume fraction of nitrogen-containing gas is 0 to about 20%. Second, the nanoparticles were compacted by vacuum hot pressing at temperature of 800° C. to 1200° C., pressure of 40 MPa to 60 MPa, time of 4 h to 6 h, and vacuum of $2\times10^{-2}$ Pa to $5\times10^{-3}$ Pa.

11 Claims, 11 Drawing Sheets

U.S. PATENT DOCUMENTS

| | | | |
|---|---|---|---|
| 5,981,416 A | | 11/1999 | Kume et al. |
| 2006/0194688 A1* | | 8/2006 | Sundberg et al. ............ 501/87 |

FOREIGN PATENT DOCUMENTS

| | | |
|---|---|---|
| JP | 60176973 A2 | 9/1985 |
| JP | 61077670 A2 | 4/1986 |
| JP | 05017233 A2 | 1/1993 |
| JP | 10182234 A2 | 7/1998 |

OTHER PUBLICATIONS

Michel W. Barsoum, "The $M_{N+1}AX_N$ Phases: A New Class of Solids; Thermodynamically Stable Nanolaminates", *Prog. Solid St. Chem.*, Vol. 28, pp. 201-281 (2000).

V.I. Ivchenko, M.I. Lesnaya, V.F. Nemchenko and T.Ya. Kosolapova, "Preparation and Some Properties of the Ternary Compound $Ti_2AlN$" *Porosh. Metall.*, 4(160) 60 (1976).

V.I. Ivchenko and T. Ya. Kosolapova, "Conditions of Preparation of Ternary Ti-Al-C Alloy Powders", *Porosh. Metall.*, 150, 1 (1975).

V.I. Ivchenko, M. I. Lesnaya, V.F. Nemchenko and T. Ya. Kosolapova "Some Physical Properties of Ternary Compounds in the System Ti-Al-C" *Porosh. Metall.*, 161, 45(1976).

V.I. Ivchenko and T. Ya., Kosolapova "Abrasive Properties of the Ternary Compounds in the Systems Ti-Al-C and Ti-Al-N", *Porosh. Metall.*, 164,56 (1976).

M.W. Barsoum, M. Ali, T. El-Raghy, "Processing and Characterization of $Ti_2AlC$, $Ti_2AlN$, and $Ti_2AlC_{0.5}N_{0.5}$", *Metallurgical and Materials Transactions A*, vol. 31A, pp. 1857-1865 (Jul. 2000).

A.T. Procopio, T. El-Raghy, and M.W. Barsoum, "Synthesis of $Ti_4AlN_3$ and Phase Equilibria in the Ti-Al-N System", *Metallurgical and Materials Transactions A*, vol. 31A, pp. 373-378 (Feb. 2000).

J.C. Schuster and J. Bauer, "The Ternary System Titanium-Aluminum-Nitrogen", *Journal of Solid State Chemistry*, 53, pp. 260-265 (1984).

T. Joelsson, A. Hörling, J. Birch, and L. Hultman, "Single-crystal $Ti_2AlN$ thin films", *Applied Physics Letters*, 86, 111913 (2005).

Nobuhiko Wada, "Preparation of Fine Metal Particles by Means of Evaporation in Helium Gas", *Japanese Journal of Applied Physics*, vol. 6, No. 5, pp. 553-556, (May 1967).

Nobuhiko Wada, "Preparation of Fine Metal Particles by Means of Evaporation in Xenon Gas", *Japanese Journal of Applied Physics*, vol. 7, No. 10, pp. 1287-1293, (Oct. 1968).

Nobuhiko Wada, "Preparation of Fine Metal Particles by the Gas Evaporation Method with Plasma Jet Flame", *Japanese Journal of Applied Physics*, vol. 8, No. 5, pp. 551-558 (May 1969).

Satoru Ohno and Masahiro Uda, "Generation Rate of Ultrafine Metal Particles in 'Hydrogen Plasma-Metal' Reaction", *J. Japan Inst. Metals*, vol. 48, No. 6, pp. 640-646 (1984).

Satoru Ohno and Masahiro Uda, "Preparation for Ultrafine Particles for Fe-Ni, Fe-Cu and Fe-Si Alloys by 'Hydrogen Plasma-Metal' Reaction", *J. Japan Inst. Metals*, vol. 53, No. 9, pp. 946-952 (1989).

James F. Shackelford and William Alexander (editors), *Materials Science and Engineering Handbook, Third Edition*. (Title Pages and Table of Contents) CRC Press LLC, 2001.

M.W. Barsoum, N. Tzenov, A. Procopio, T. El-Raghy and M. Ali, "Oxidation of $Ti_{n+1}AlX_n$ (n-1-3 and X=C, N), II. Experimental Results", *Journal of the Electrochemical Society*, 148 (8), C551-C562 (2001).

H.B. Zhang, Y.C. Zhou, Y.W. Bao, M.S. Li, "Improving the oxidation resistance of $Ti_3SiC_2$ by forming a $Ti_3Si_{0.9}Al_{0.1}C_2$ solid solution", *Acta Materialia Inc.* 52 (2004) 3631-3637.

Z. Sun, Y. Zhou and M. Li, "High Temperature Oxidation Behavior of $Ti_3SiC_2$-Based Material in Air", *Acta mater*, 49 (2001) 4347-4353.

International Search Report from corresponding PCT Application No. PCT/CN2005/001048.

* cited by examiner

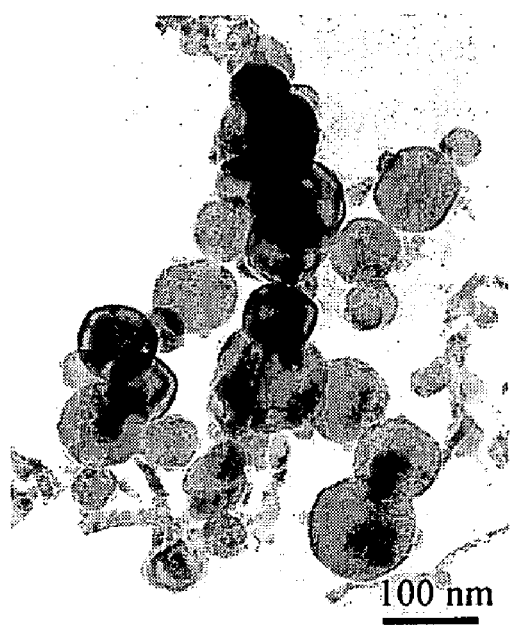 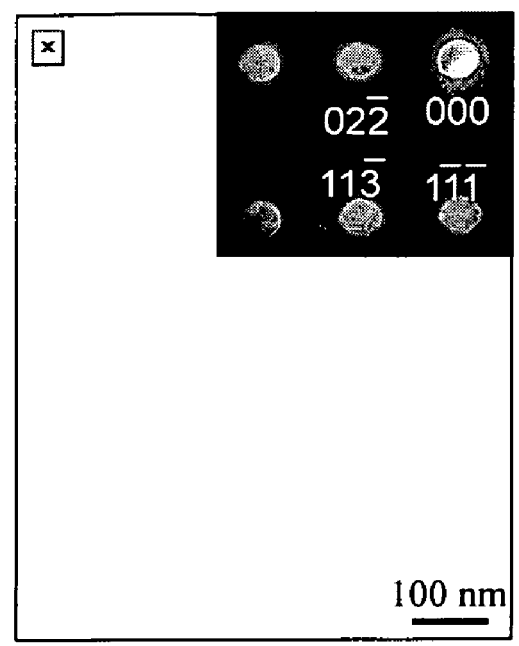
Figure 1                                Figure 2

AL$_2$O$_3$ DISPERSION-STRENGTHENED TI$_2$ALN COMPOSITES AND A METHOD FOR PRODUCING THE SAME

This Application is a US National Phase of the International Application No. PCT/CN2005/001048 filed Jul. 15, 2005 designating the US and published in China on Jan. 19, 2006 as WO 2006/005267, which claims priority of Chinese Patent Application No. 200410020970.4, filed Jul. 15, 2004.

FIELD OF THE INVENTION

The invention relates to ceramic composites and a method for preparing the same, and specifically, the invention relates to Al$_2$O$_3$ dispersion-strengthened Ti$_2$AlN composites and preparation methods thereof. The ceramic composites possess high hardness, high strength and excellent oxidation resistance of Al$_2$O$_3$, and have metal-like characteristics such as electrical conductivity, machinability etc. of Ti$_2$AlN.

BACKGROUND OF THE INVENTION

In the 1960s, Nowotny and his co-authors have prepared many ternary carbides or nitrides and studied their structural characteristics (H. Nowotny, Prog. Solid State Chem., 2, 27 (1970)). These ternary carbides and nitrides are expressed by a general formula of M$_{n+1}$AX$_n$, where M is a transition metal, A is a main group (mostly IIIA and IVA) element, X is either C or N element, and n is 1, 2, or 3. The ternary layered compounds, M$_{n+1}$AX$_n$, are abbreviated to MAX phases (M. W. Barsoum, Prog. Solid State Chem., 28, 201 (2000)). The ternary layered compounds all have hexagonal structures which can be described as octahedron being interleaved with atoms layers, and their physical and mechanical properties are closely related to the corresponding carbides and nitrides.

The common characteristic of MAX phases is that they are comprised of covalent bonding, metallic bonding and ionic bonding. So, MAX phases possess combination properties of both ceramics and metals, such as good electrical and thermal conductivity, machinability, excellent thermal shock resistance, high modulus, and high specific strength and so on. In MAX phases, TiAX phases, including Ti$_3$SiC$_2$, Ti$_2$AlC, Ti$_2$AlN, and Ti$_4$AlN$_3$, have been extensively investigated.

In the early 1960s, Jeitschko et al. (W. Jeitschko, H. Nowotny, F. Benesovsky, Monatsh. Chem., 95, 1198(1963)) discovered and deciphered the cell structure of Ti$_2$AlN. In the mid 1970s, Ivchenko et al. (V. I. Ivchenko, M. I. Lesnaya, V. F. Nemchenko, T. Y. Kosolapova, Porosh. Metall., 160, 60 (1976); V. I. Ivchenko, T. Y. Kosolapova, Porosh. Metall., 150, 1 (1975); V. I. Ivchenko, M. I. Lesnaya, V. F. Nemchenko, T. Y. Kosolapova, Porosh. Metall., 161, 45 (1976); V. I. Ivchenko, T. Y. Kosolapova, Porosh. Metall., 164, 56 (1976)) fabricated Ti$_2$AlN bulk sample with a density of 90% to 92% and measured some of their properties. Ivchenko et al. reported that microhardness values were higher than 20 GPa, comparable to the hardness of binary nitride. This is much higher than the hardness (4 GPa) of Ti$_2$AlN subsequently reported by Barsoum et al. (M. W. Barsoum, M. Ali, T. El-Raghy, Met. Mater. Trans., 31A, 1857 (2000)). With reference to the other properties of TiAX phases, it can be deduced that the properties of Ti$_2$AlN reported by Barsoum et al. are very close to the truth. Although Ti$_2$AlN is the first ternary nitride discovered and extensively researched, it is relatively difficult to produce pure Ti$_2$AlN. The Ti$_2$AlN sample made by Barsoum et al. also includes three other phases (11% to 20% by volume), in addition to the Ti$_2$AlN matrix, which are Al$_2$O$_3$, Ti$_3$P, and a phase with a Ti:Al:N ratio of 4:1:3. Despite their best efforts, the sample of this "413" phase cannot be eliminated. The best samples contained 10% to 15% "413" phase. This "413" phase is not Ti$_4$AlN$_3$ (A. T. Procopio, T. El-Raghy, M. W. Barsoum, Met. Mater. Trans., 31A, 373 (2000)) that was reported as Ti$_3$Al$_2$N$_2$ phase in 1984 by Schuster and Bauer (J. C. Schuster, J. Bauer, J. Solid State Chem., 53, 260 (1984)).

Ti$_2$AlN is a ternary nitride ceramic of hexagonal-close-packed structure, with Ti at 4f, Al at 2c positions, and N filling the interspaces of Ti octahedron. The methods of synthesizing Ti$_2$AlN reported so far include solid reaction method (M. W. Barsoum, M. Ali, T. El-Raghy, Metall. Mater. Trans., 31A, 1857 (2000)) and magnetron sputtering method (T. Joelsson, A. Horling, J. Birch, L. Hultman, App. Phy. Lett. 86, 111913 (2005)). Ti$_2$AlN bulk sample with 80% (by volume) Ti$_2$AlN phase was obtained after reactive hot-isostatic pressing (HIP) at 1400° C. under a pressure of 40 MPa for 48 hours, with micron-scale pure Ti powder and AlN powder, in Barsoum's method. But Barsoum's preparation method had some shortcomings such as high reactive temperature, long time, large grain size of the bulk and the like. For the magnetron sputtering method, relatively pure Ti$_2$AlN thin film can be obtained, but it is difficult to produce bulk materials and the yield is relatively low. Ti$_2$AlN is a potential candidate of high-temperature structure materials for use in the temperature range of 1000° C. to 1300° C. However, the oxidation behavior follows the parabolic law in the range of 1000° C. to 1100° C. for time shorter than 20 h; for time longer than 20 h, the oxidation behavior deviates from the parabolic law and becomes linear law. Thus, the high-temperature oxidation properties are unsuitable for the use at a temperature range of 1000° C. to 1300° C. for a long time. So it is necessary to improve the high-temperature oxidation properties of Ti$_2$AlN.

Al$_2$O$_3$ is an ionic oxide with slight distortion hexagonal-close-packed structure, with O$^{2-}$ at hexagonal-close-packed lattice position, and Al$^{3+}$ filling the interspaces of O$^{2-}$ octahedron. This structure remains relatively stable up to the melting point, so the working temperature of Al$_2$O$_3$ can approach to 1800° C. There is almost no loss or gain in weight when Al$_2$O$_3$ is used in an air atmosphere. Moreover, Al$_2$O$_3$ and Ti$_2$AlN are very close in density and thermal expansion coefficient, are compensated each other in hardness and compressive strength. Al$_2$O$_3$ is chosen to strengthen Ti$_2$AlN matrix, which can improve the high-temperature oxidation properties at the same time. Table 1 shows the main properties of Al$_2$O$_3$ and Ti$_2$AlN.

TABLE 1

Physical and mechanical properties of Ti$_2$AlN and Al$_2$O$_3$

| Properties | Ti$_2$AlN | Al$_2$O$_3$ |
|---|---|---|
| Density (g/cm$^3$) | 4.31 | 3.9 |
| Vickers Hardness (GPa) | 4 | 26 |
| Compressive Strength (MPa) | 450 | 2945 |
| Electrical Resistivity (μΩ · m) | 0.25, 0.312 | >10$^{18}$ |
| Thermal Expansion Coefficient (K$^{-1}$) | 8.2 × 10$^{-6}$ | 8.3 × 10$^{-6}$ |
| Young's Modulus (GPa) | — | 380 |
| | | 386 |
| Shear Modulus (GPa) | — | 175 |
| Melting Point (° C.) | — | 2054 |

Generally, Al$_2$O$_3$ dispersion-strengthened Ti$_2$AlN composites are compacted by hot pressing or hot isostatic pressing via powder metallurgy method. There are the following several methods to proportion powders:

1. The use of $Al_2O_3$ powders and $Ti_2AlN$ powders, which belongs to the type of no in situ reaction;

2. The use of $Al_2O_3$ powders and raw powders to form $Ti_2AlN$, which belongs to the type of in situ reaction to form $Ti_2AlN$;

3. The use of raw powders, which belongs to the type of in situ reactions to form $Al_2O_3$ and $Ti_2AlN$.

For the first and second method, there are problems such as non-homogenous distribution, easy agglomeration and significant particle growth of $Al_2O_3$. These problems become more severe with increasing volume fraction of $Al_2O_3$. For the third method, the in situ formed $Al_2O_3$ particles are fine and uniformly dispersed and the volume fraction of $Al_2O_3$ can be controlled up to 50%.

In order to obtain in situ formed $Al_2O_3$ particles dispersion-distributed in the $Ti_2AlN$ grains formed by an in situ reaction, powders are produced by a hydrogen plasma-metal reaction method (HPMR). HPMR is suitable for industrial production for use of the preparation of nanoparticles of various metals and alloys. The fundamental principle of HPMR is a process in which atoms are changed from a liquid state to a gas state by using a plasma heat source In the gas state, atom clusters collide with inert gas to transfer energy and make gas clusters cool quickly, producing nanoparticles. During the development of HPMR, Wada (N. Wada, Jpn. J. Appl. Phys., 6, 553 (1967); N. Wada, Jpn. J. Appl. Phys., 7, 1287 (1968); N. Wada, Jpn. J. Appl. Phys., 8, 551 (1969)) first investigated the effects of pressure and kinds of gases on the particle size of as-prepared powder and found that the addition of hydrogen to atmosphere can accelerate the evaporation of metals. Uda et al. (M. Uda, Bull. Japan Inst. Metals., 22, 412 (1983); S. Ohno, M. Uda, J. Japan Inst. Metals., 48, 640 (1984); S. Ohno, M. Uda, J. Japan Inst. Metals., 53, 946 (1989)) extended Wada's method by using a mixture of hydrogen and argon gas with a total pressure of 1 atm, and by substituting the plasma jet gun with an general tungsten electrode. These measures improved the yield of nanopowders from laboratory scale to industrial production. Uda et al. (S. Ohno, M. Uda, J. Japan Inst. Metals., 48, 640 (1984)) found in their study that the driving force for generation of nanoparticles from metals is closely related to these factors such as the heat of evaporation of metals, the heat of formation for recombination from atoms (dissolved in metal) to molecules (evolved into gas phase) of hydrogen and melting points of metals. Ohno and Uda (S. Ohno, M. Uda, J. Japan Inst. Metals., 53, 946 (1989)) studied the evaporation rules of a series of pure metals, and investigated the preparation and characteristics of nanoparticles of Fe—Ni, Fe—Cu and Fe—Si binary alloys. The Chinese Patent Application No. 03133805.4 investigated the synthesis of nanoparticles of Ti-Al binary system. The research disclosed that the concentration of Al of the nanoparticles deviate positively from that of the master alloys. Components of nanoparticles to be used for the preparation of the composites have been designed according to research results of the patent.

From the above, we know that it is relatively difficult to synthesize $Ti_2AlN$. The available technologies are mainly solid reaction methods, and the recently reported magnetron sputtering method was used to synthesize $Ti_2AlN$ thin film but not bulk material. Little research has been performed on $Ti_2AlN$ due to the difficulty in synthesis. Up to now, there has been no report on the $Ti_2AlN$ composites strengthened by $Al_2O_3$.

SUMMARY OF THE INVENTION

An objective of the invention is to provide $Al_2O_3$ dispersion-strengthened $Ti_2AlN$ composites with high hardness, high strength, good oxidation resistance, and good electrical conductivity and easy workability.

The inventors have carried out extensive research in order to overcome the existing problem in the prior art.

The invention provides $Al_2O_3$ dispersion-strengthened $Ti_2AlN$ composites. The ceramic composites comprise $Ti_2AlN$ matrix and $Al_2O_3$ strengthening phase, with $Al_2O_3$ particles dispersed homogenously in the $Ti_2AlN$ matrix. The characteristics of the composites include high hardness, high strength, excellent oxidation resistance due to $Al_2O_3$, and at the same time metal-like properties such as good electrical conductivity and easy machinability due to $Ti_2AlN$.

In the as-provided $Al_2O_3$ dispersion-strengthened $Ti_2AlN$ composites of the invention, $Ti_2AlN$ matrix and $Al_2O_3$ strengthening phase are both reactively formed in situ. $Al_2O_3$ particles are equiaxed, and the particle size of $Al_2O_3$ distributes in the range of 500 nm and 2 μm with an average of about 0.8 μm to 1.2 μm; the grains of $Ti_2AlN$ are plate-shaped with a thickness of about 80 nm to 120 nm and a length of 0.5 μm to 2 μm, and an average geometric size of about 0.2 μm to 0.5 μm. The average geometric size means a value obtained by extracting a square root of a product of the length and width.

In the as-provided $Al_2O_3$ dispersion-strengthened $Ti_2AlN$ composites of the invention, the volume fraction of $Al_2O_3$ is 5% to 50%, preferably 15% to 45%, further preferably 20% to 40%.

In the as-provided $Al_2O_3$ dispersion-strengthened $Ti_2AlN$ composites of the invention, the Vickers hardness is 7 GPa to 12 GPa.

In the as-provided $Al_2O_3$ dispersion-strengthened $Ti_2AlN$ composites of the invention, the compressive strength at room temperature is 1000 MPa to 1900 MPa.

In the as-provided $Al_2O_3$ dispersion-strengthened $Ti_2AlN$ composites of the invention, the mass gain per unit area in a temperature range of 1100° C. to 1350° C. is 0.5 $mg/cm^2$ to 15 $mg/cm^2$.

In the as-provided $Al_2O_3$ dispersion-strengthened $Ti_2AlN$ composites of the invention, the electrical resistivity at room temperature is 0.3 μΩ·m to 0.8 μΩ·m.

The invention also provides a method for preparing $Al_2O_3$ dispersion-strengthened $Ti_2AlN$ composites. The composites comprise $Ti_2AlN$ matrix and $Al_2O_3$ strengthening phase, with $Al_2O_3$ particles dispersed homogenously in the $Ti_2AlN$ matrix. The $Ti_2AlN$ matrix and $Al_2O_3$ strengthening phase are both reactively formed in situ. The characteristics are summarized as follows.

The method includes: preparing nanoparticles of Ti—Al binary system by the hydrogen plasma-metal reaction; and then compacting the nanoparticles by vacuum hot pressing or hot isostatic pressing.

In the as-provided preparation method of $Al_2O_3$ dispersion-strengthened $Ti_2AlN$ composites, the atmosphere is a mixture atmosphere of a nitrogen-containing gas, $H_2$, and Ar with a pressure of 0.8 atm to 1.2 atm.

In the as-provided preparation method of $Al_2O_3$ dispersion-strengthened $Ti_2AlN$ composites, the nitrogen-containing gas is $N_2$ or $NH_3$ gas, with a volume fraction of 0 to 20%.

In the as-provided preparation method of $Al_2O_3$ dispersion-strengthened $Ti_2AlN$ composites, the nanopowders of Ti—Al system are prepared with Ti—Al master alloys, wherein the Ti—Al master alloys are Ti—Al alloy rods with Al content of 20% to 60% by atom, pure Al rods and pure Ti rods, in a manner of continual feeding.

In the as-provided preparation method of $Al_2O_3$ dispersion-strengthened $Ti_2AlN$ composites, the nanopowders of Ti—Al system are nanopowders with Ti or Al pure element, or alloy nanopowders.

In the as-provided preparation method of $Al_2O_3$ dispersion-strengthened $Ti_2AlN$ composites, the nanoparticles of Ti—Al system include Ti, TiN, intermetallic compounds of Ti—Al system, Al, and AlN.

In the as-provided preparation method of $Al_2O_3$ dispersion-strengthened $Ti_2AlN$ composites, the oxygen content of the nanopowders of Ti—Al system is 0 to 20% by weight.

In the as-provided preparation method of $Al_2O_3$ dispersion-strengthened $Ti_2AlN$ composites, the parameters of the vacuum hot pressing are: temperature of 800° C. to 1200° C.; pressure of 40 MPa to 60 MPa; time of 4 h to 6 h; and vacuum of $2\times10^{-2}$ Pa to $5\times10^{-3}$ Pa.

The invention also provides a preparation method of $Ti_2AlN$ bulk material. The method includes: preparing nanoparticles of Ti—Al binary system by HPMR; and then compacting the nanoparticles by vacuum hot pressing or hot isostatic pressing.

DESCRIPTION OF THE DRAWINGS

FIG. 1 is a typical bright-field TEM micrograph of alloy nanoparticles produced by HPMR, with nearly spherical shape;

FIG. 2 is a typical bright-field TEM micrograph of alloy nanoparticles produced by HPMR, with nearly cubic shape (Inset is the selected-area electron diffraction (SAED) pattern of cubic particle);

MODE OF CARRYING OUT THE INVENTION

The $Al_2O_3$ dispersion-strengthened $Ti_2AlN$ composites of the invention comprise $Ti_2AlN$ matrix and $Al_2O_3$ strengthening phase, with $Al_2O_3$ particles dispersed homogenously in $Ti_2AlN$ matrix. The characteristics of the composites are high hardness, high strength, excellent oxidation resistance due to $Al_2O_3$, and at the same time metal-like properties such as good electrical conductivity and easy machinability etc. due to $Ti_2AlN$.

In the $Al_2O_3$ dispersion-strengthened $Ti_2AlN$ composites of the invention, $Ti_2AlN$ matrix and $Al_2O_3$ strengthening phase are both reactively formed in situ. $Al_2O_3$ particles is equiaxed crystals, and the particle size of the $Al_2O_3$ distributes in the range of 500 nm and 2 μm, the mean size of the $Al_2O_3$ particles is about 0.8 μm to 1.2 μm; and The grains of $Ti_2AlN$ is plate-like, about 80 nm to 120 nm thick and 0.5 μm to 2 μm long, and with an average geometric size of about 0.2 μm to 0.5 μm.

In the $Al_2O_3$ dispersion-strengthened $Ti_2AlN$ composites of the invention, the volume fraction of $Al_2O_3$ is 5% to 50%.

Figure 3:
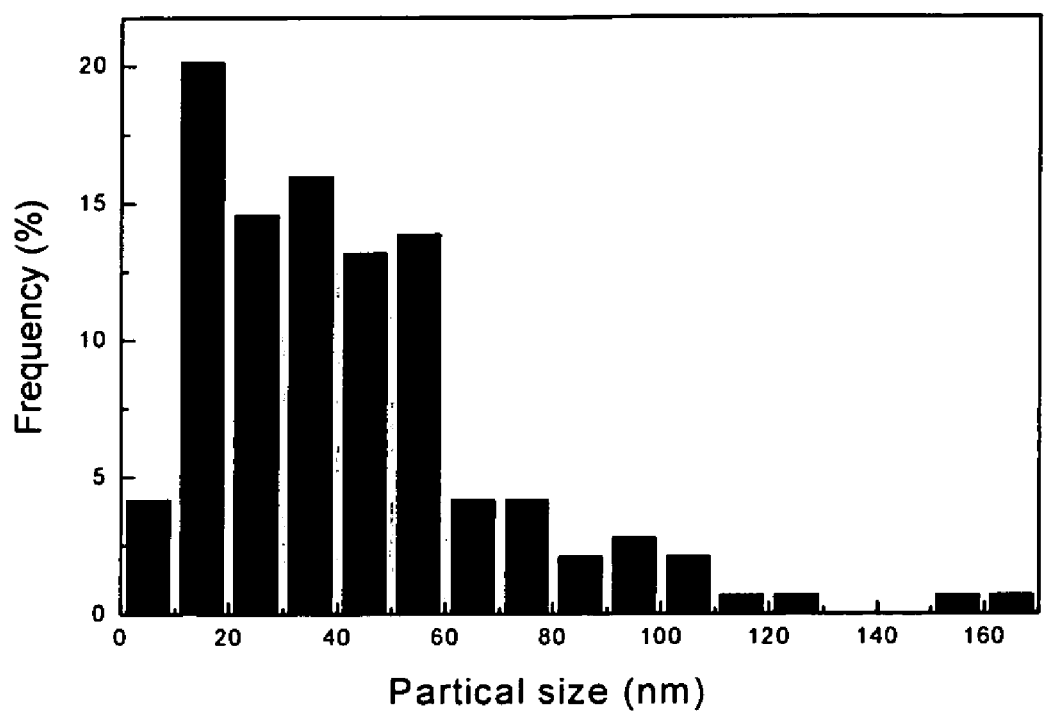
FIG. 3 shows particle size distribution of alloy nanoparticles produced by HPMR.

The $Al_2O_3$ dispersion-strengthened $Ti_2AlN$ composites of the invention were prepared according to the method characterized in that:

First, nanoparticles of the composites were prepared by HPMR continuously supplied with the master alloys of Ti—Al alloy rods with Al content, in atom %, of 20% to 60%. The chamber atmosphere is the mixture gas of $N_2$, $H_2$ and Ar, with volume fraction of $N_2$ from 0 to 20%, and volume ratio of $H_2$ and Ar in the range of 0.8 to 1, with a total pressure of 0.8 to 1.2 atm. FIGS. 1 and 2 show the TEM bright field images of nanopowders prepared with $N_2$ volume fraction of 10%. Inset in FIG. 2 is the micro-diffraction pattern of a cubic nanoparticle. There are two typical micrographs of the nanopowders produced in situ, a nearly spherical shape and cubic shape, wherein the cubic shape particles are ceramic powder of TiN phase. FIG. 3 displays the particle size distribution of nanopowders measured by TEM photographs. As shown in FIG. 3, nanopowders distribute in the range of 10 nm to 200 nm, mainly in the range of 20 nm to 60 nm, little in the range of 100 to 200 nm, with the average size of 42 nm.

Figure 4:
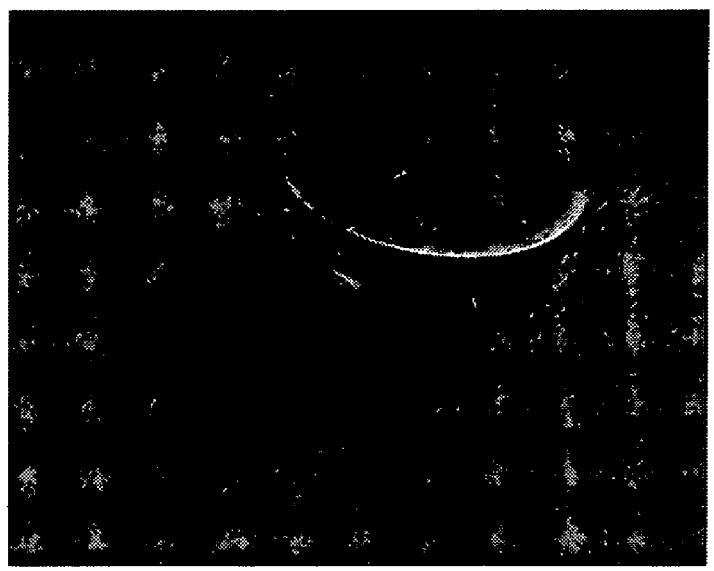
FIG. 4 is an appearance view of the $Al_2O_3$ dispersion-strengthened $Ti_2AlN$ composite.

Second, the nanopowders were compacted by vacuum hot pressing. The parameters of this process include: the temperature is 800° C. to 1200° C., the pressure is 40 MPa to 60 MPa, time is 4 h to 6 h, the vacuum is $2\times10^{-2}$ Pa to $5\times10^{-3}$ Pa. FIG. 4 shows macro-photograph of the $Al_2O_3/Ti_2AlN$ composite sample 50 mm in diameter and 5 mm in height. Metallographic observation, phase analysis by X-ray, electrical resistivity, and hardness test were carried out for the as-produced composites. The compression and flexure properties at different temperature and the oxidation behavior at high temperature of the composites were systematically studied.

Figure 5:
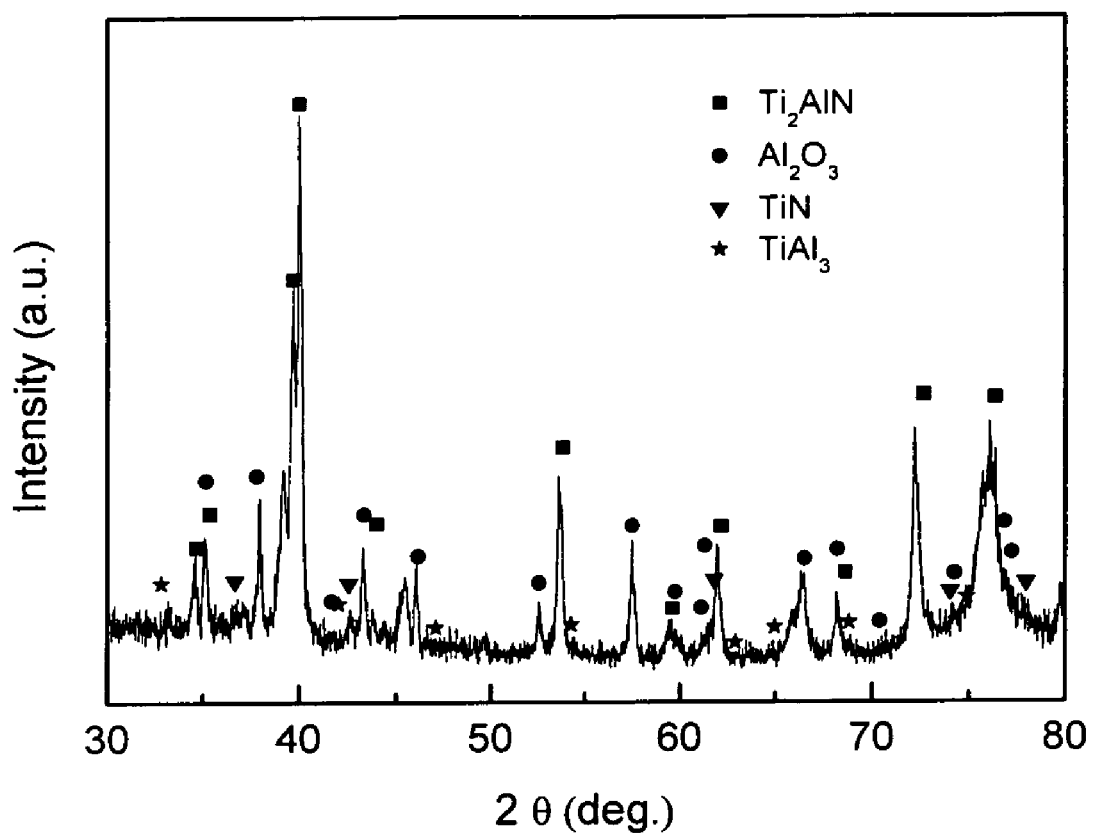
FIG. 5 shows an x-ray diffraction pattern of the $Al_2O_3$ dispersion-strengthened $Ti_2AlN$ composite produced in Example 5.
Figure 6:
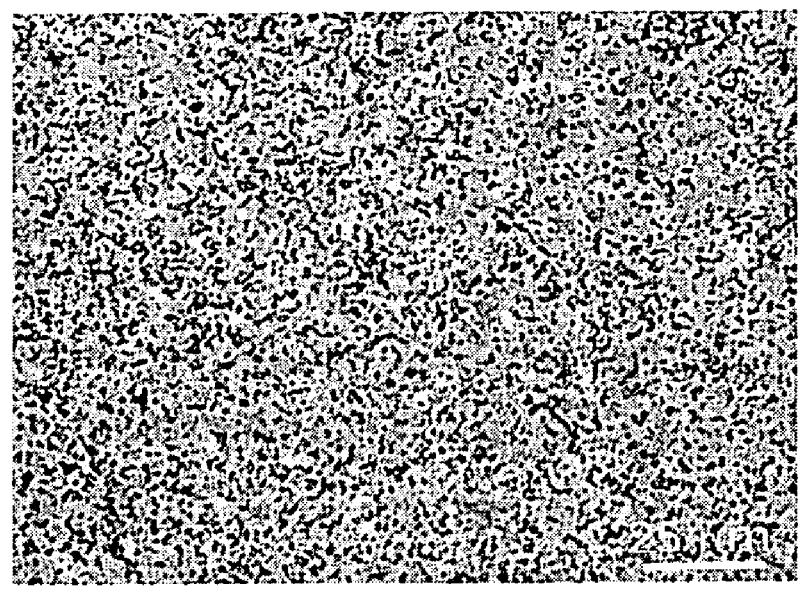
FIG. 6 is an optical image of the $Al_2O_3$ dispersion-strengthened $Ti_2AlN$ composite produced in Example 5.
Figure 7:
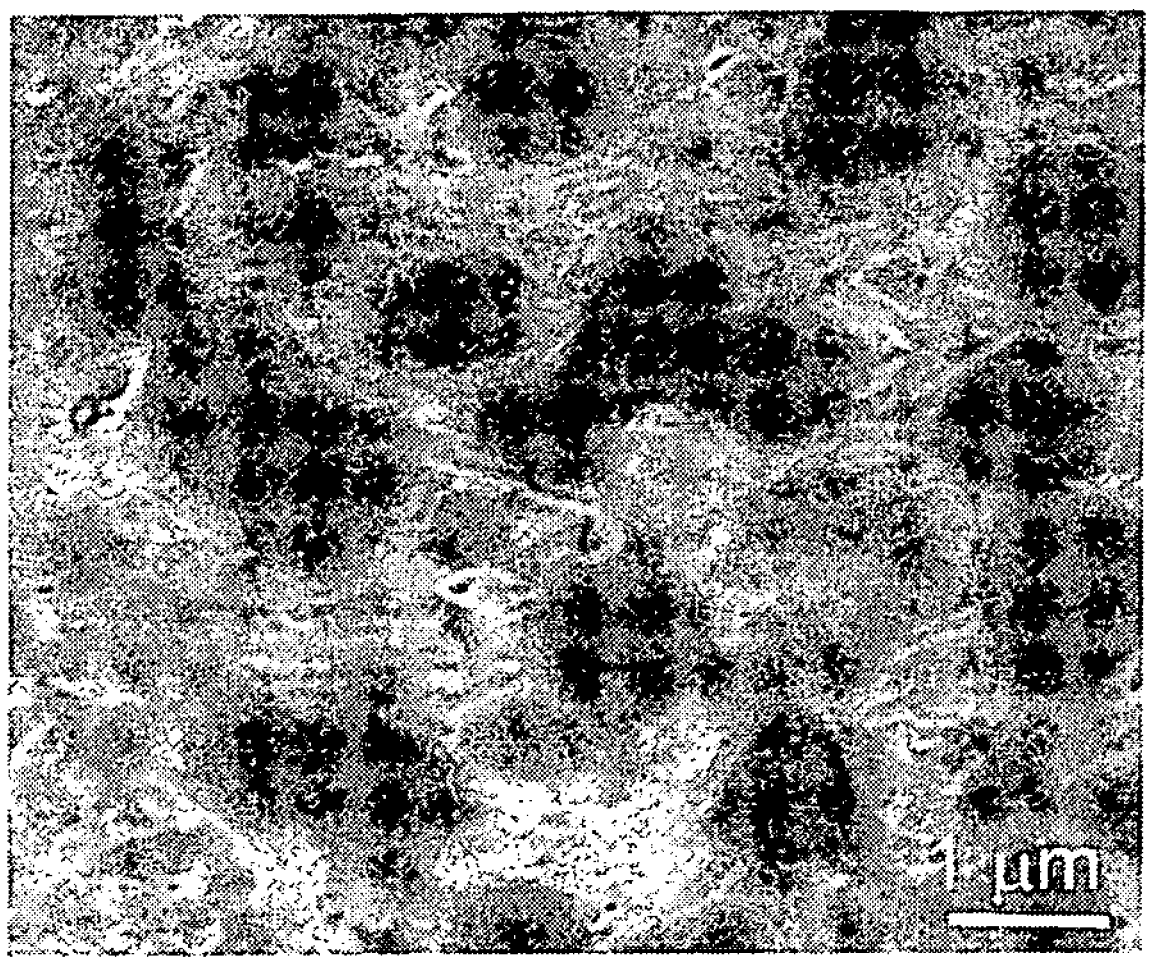
FIG. 7 is a high-magnification SEM image of the $Al_2O_3$ dispersion-strengthened $Ti_2AlN$ composite produced in Example 5.
Figure 8:
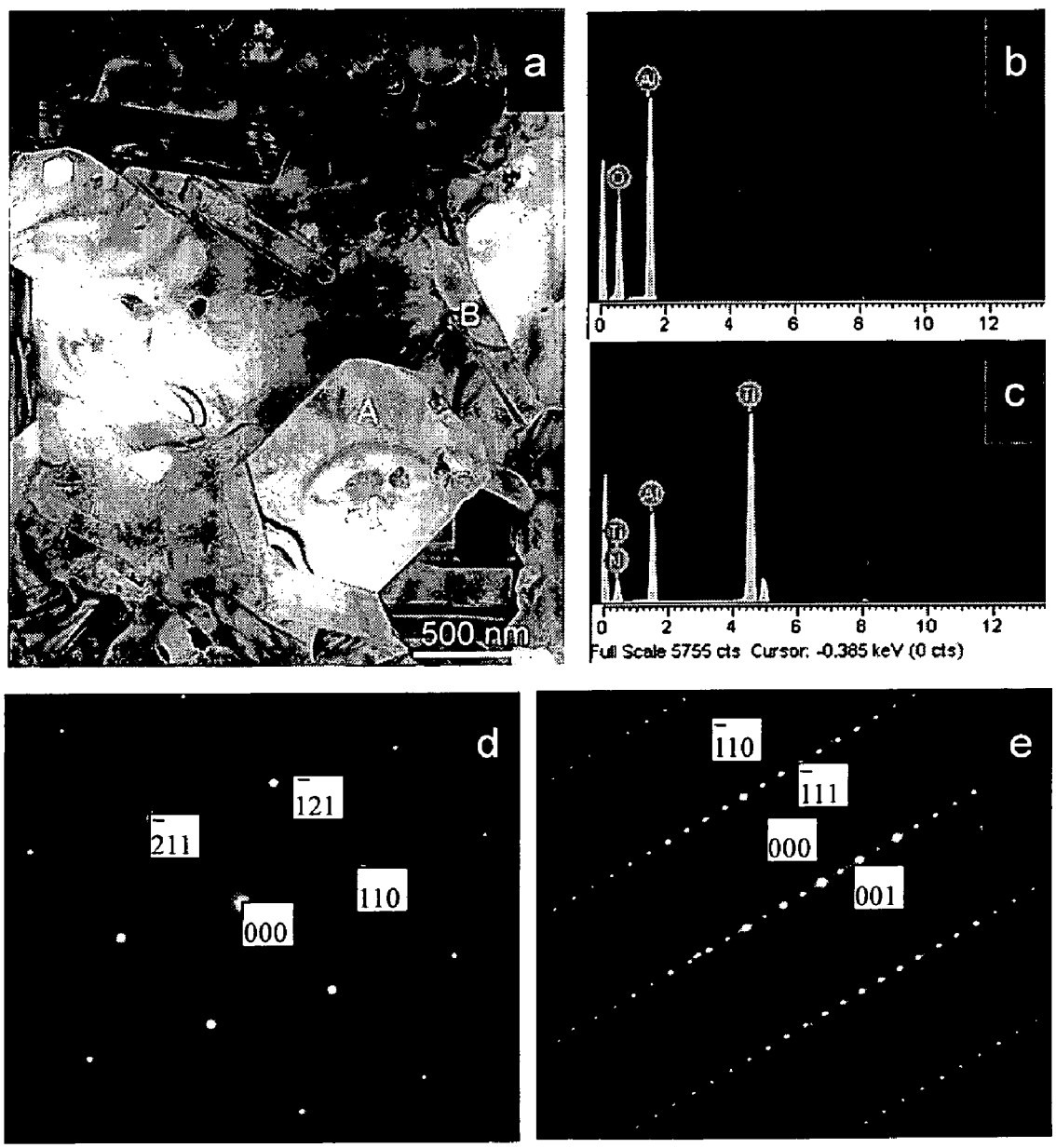
FIG. 8 shows (a) TEM bright-field image, (b) and (c) EDS x-ray spectra from A and B in (a), (d) and (e) the SAED patterns from zone A and zone B, respectively, for as-HPed sample of the $Al_2O_3$ dispersion-strengthened $Ti_2AlN$ composite produced in Example 5.

An Al$_2$O$_3$/Ti$_2$AlN composite with 40% (by volume) Al$_2$O$_3$ was made as example to demonstrate the structural characteristics, mechanical properties and high-temperature oxidation properties of Al$_2$O$_3$ dispersion-strengthened Ti$_2$AlN composites. FIG. 5 shows the XRD pattern of the Al$_2$O$_3$ dispersion-strengthened Ti$_2$AlN composite produced in Example 5. It is shown that the composite mainly comprises the as-formed phases of Al$_2$O$_3$ and Ti$_2$AlN, additionally with a small amount of reaction phases: TiN and TiAl$_3$. FIG. 6 is an optical image of the Al$_2$O$_3$ dispersion-strengthened Ti$_2$AlN composite produced in Example 5. Black spots in the image represent Al$_2$O$_3$ particles, with size mostly in the range of 500 nm to 2 µm, and mean size of about 0.8 µm to 1.2 µm. Al$_2$O$_3$ particles disperse uniformly in Ti$_2$AlN matrix. FIG. 7 shows a high-magnification SEM image of the etched sample of the Al$_2$O$_3$ dispersion-strengthened Ti$_2$AlN composite produced in Example 5. As shown in FIG. 7, it is clearly observed that Ti$_2$AlN matrix is fine and plate-like shape grains, different from the equiaxed grains of Al$_2$O$_3$. FIG. 8 shows (a) TEM bright-field image of the Al$_2$O$_3$ dispersion-strengthened Ti$_2$AlN composite produced in Example 5, (b) and (c) are EDS x-ray spectra from A and B in (a), (d) and (e) are the SAED patterns from zone A and zone B, respectively. As shown in FIG. 8(*a*), it is known that Al$_2$O$_3$ particles were interleaved by Ti$_2$AlN grains, and grain boundaries were not observed in Al$_2$O$_3$ particles, indicating that Al$_2$O$_3$ particles belong to single crystal. Ti$_2$AlN phase is in the form of plate-shaped grains about 100 nm thick and 0.5 µm to 2 µm long. Quantitative measurements from EDS curves of FIG. 8 (*b*) and (*c*) show that, zone A comprises 44.45% by atom of Al and 55.55% by atom of O; zone B comprises, 29.33% by atom of Al, 14.28% by atom of N and 56.39% by atom of Ti. This indicates apparent difference in composition between the two phases. Combined analysis of EDS and electron diffraction suggests that the in situ formed Al$_2$O$_3$ is thermodynamically stable α-Al$_2$O$_3$, and complies with stoichiometric relation, while the matrix is Ti$_2$AlN phase.

Figure 9:
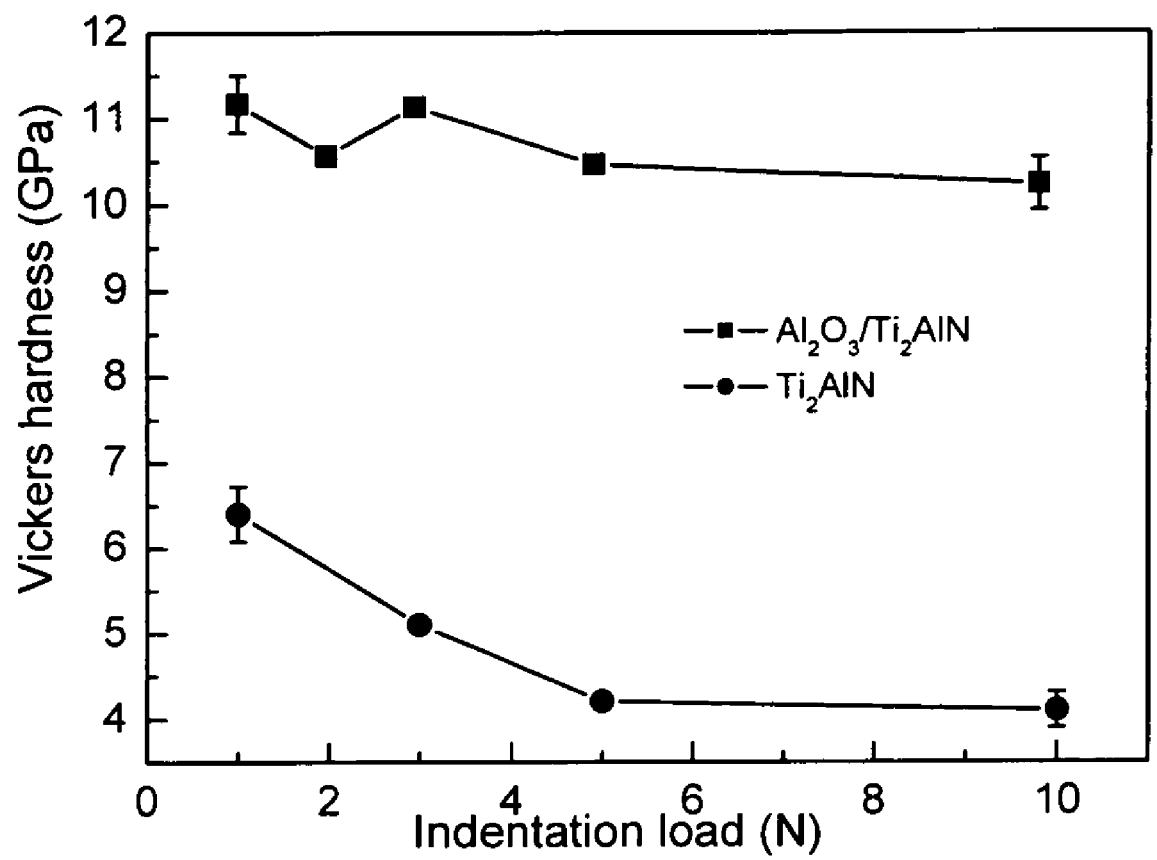
FIG. 9 shows a graph of the relation between the microhardness and indentation load of the $Al_2O_3$ dispersion-strengthened $Ti_2AlN$ composite produced in Example 5.
Figure 10:
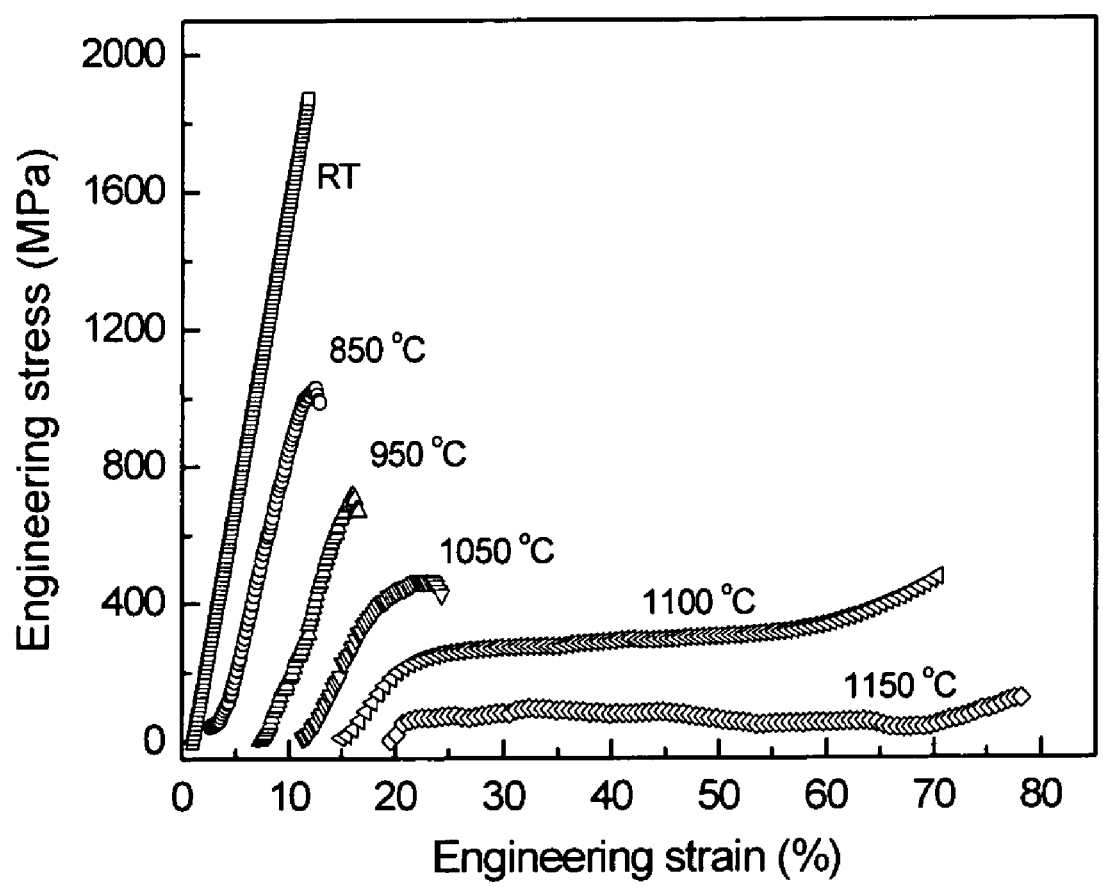
FIG. 10 shows compression stress-strain curves of the $Al_2O_3$ dispersion-strengthened $Ti_2AlN$ composite produced in Example 5 at different temperature, with initial strain rate of $3\times10^{-3}$/s.

FIG. 9 shows a graph of the relation between the microhardness and indentation load of the Al$_2$O$_3$ dispersion-strengthened Ti$_2$AlN composite produced in Example 5, the microhardness data of Ti$_2$AlN are taken from literature (M. W. Barsoum, M. Ali, T. El-Raghy, Metall. Mater. Trans., 31A, 1857 (2000)). It is seen that hardness of the composite is 2.5 times that of Ti$_2$AlN. In situ formed Al$_2$O$_3$ significantly improves the hardness of the composite which does not change much with indentation load. FIG. 10 shows compression stress-strain curves of the Al$_2$O$_3$ dispersion-strengthened Ti$_2$AlN composite produced in Example 5 at different temperature, with initial strain rate of $3\times10^{-3}$/s. It can be seen from the drawing that when the temperature is less than 1050° C., the stress-strain curve is close to a straight line, and the fracture is brittle fracture. The fracture strength decreases from 1870 MPa to 720 MPa with test temperature increasing from room temperature to 950° C. At 1050° C., the stress-strain curve deviates from a straight line, with so-called yield phenomenon appearing, and the permanent strain at failure is 5%. At 1100° C., the stress-strain curve exhibits the characteristics of metal deformation. Three typical regions exist: an elastic regime, a hardening regime and a softening regime. The composite exhibits excellent deformability and has engineering strain at least of 60%. At 1150° C., the stress-strain curve mainly exhibits the softening regime at very low stress, with a distinctly shortened elastic regime and hardly any hardening regime. It is noted that the ends of curves in FIG. 9 for the tests at 1100° C. and 1150° C. do not represent fracture; the tests were simply interrupted due to the measurement limit of test machine. The excellent compressive deformability of the composite has not been reported in TiAX phase. Meanwhile, the large deformation of the Al$_2$O$_3$/Ti$_2$AlN composites was attained at relatively low temperature (<1200° C.) and relatively rapid strain rate ($3\times10^{-3}$/s), compared with that of other ceramics, which is important for the hot workability of the composites.

Figure 11:
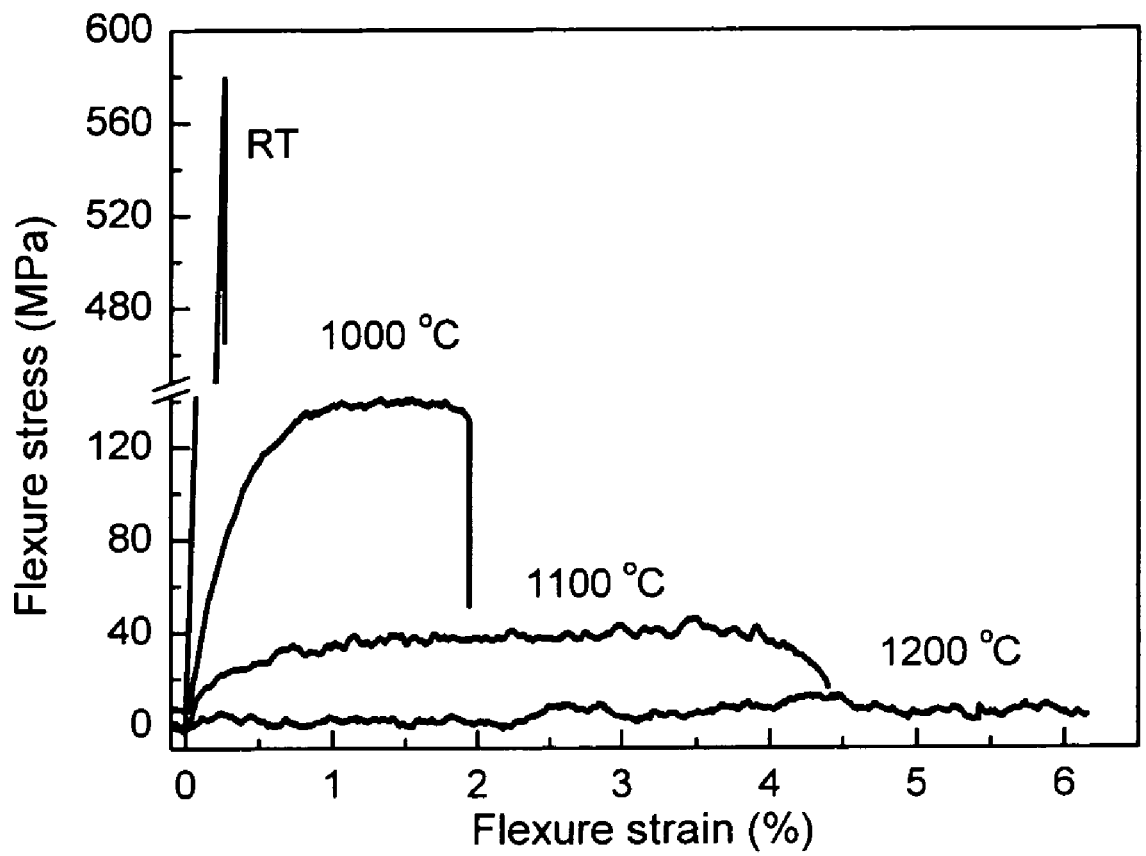
FIG. 11 shows flexure stress-strain curves of the $Al_2O_3$ dispersion-strengthened $Ti_2AlN$ composite produced in Example 5 at different temperature, using a constant crosshead speed of 0.5 mm/min.

FIG. 11 displays flexure stress-strain curves of the Al$_2$O$_3$ dispersion-strengthened Ti$_2$AlN composite produced in Example 5 at different temperature. The flexure stress-strain curve at room temperature is linear to failure, with the characteristics of brittle failure. The flexure strength is 580 MPa, close to that of Al$_2$O$_3$. At 1000° C., the stress-strain curve deviates from a straight line, and exhibits three stages: an elastic regime; a transient, apparent hardening regime and a softening regime. The flexure strength is 140 MPa and the flexure strain at failure is 1.8%. At 1100° C., the elastic regime and the transient, apparent hardening regime are shortened, while the softening regime significantly increases. The flexure strength is 40 MPa and the sample does not fracture. Microcracks were observed at the tensile stress side. At 1200° C., the elastic regime and hardening regime disappear, and only the softening regime exists. The curve nearly parallels to the axis of flexure strain. The flexure strength is 10 MPa, the sample does not fracture, and microcracks were not observed at the tensile stress side of the sample.

Figure 12:
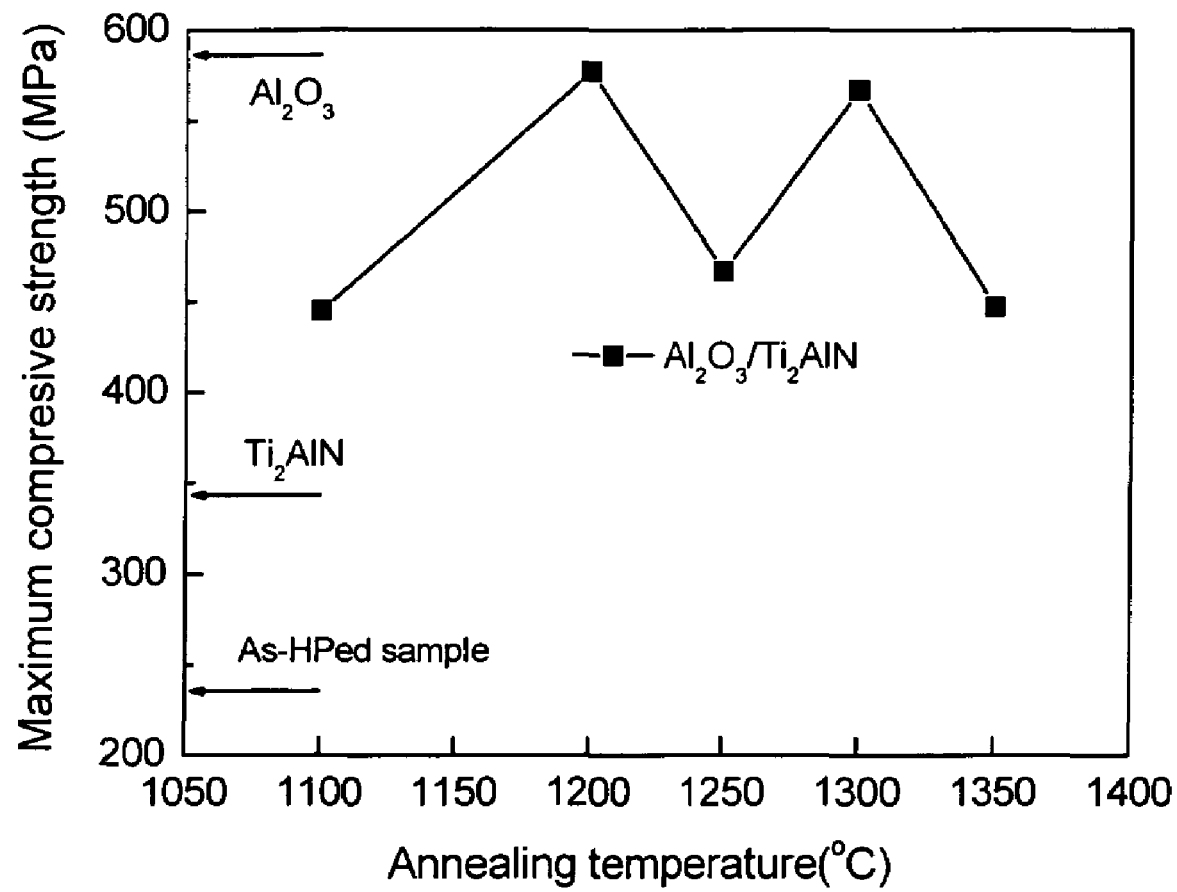
FIG. 12 shows the variation relation of the maximum compressive stress with annealing temperature of the $Al_2O_3$ dispersion-strengthened $Ti_2AlN$ composite produced in Example 5 tested at 1100° C., wherein the values of $Ti_2AlN$ and $Al_2O_3$ as indicated in the figure are taken from literatures respectively, (M. W. Barsoum, M. Ali, T. El-Raghy, Metall. Mater. Trans., 31A, 1857 (2000)) and (W. Alexander, J. Shackelford, CRC Materials Science and Engineering Handbook (CRC, 5th Edition, 2001))

FIG. 12 shows the variation relation of the maximum compressive stress with annealing temperature of as-annealed samples of the Al$_2$O$_3$ dispersion-strengthened Ti$_2$AlN composite produced in Example 5 tested at 1100° C., with initial strain rate of 3×10-3/s. HP, 1100S, 1200S, 1250S, 1300S, and 1350S in FIG. 12 represent respectively the as-HPed sample, the as-annealed samples at 1100° C./20 h, 1200° C./20 h, 1250° C./20 h, 1300° C./20 h, 1350° C./20 h, respectively. It is seen that the MCS of HP sample is lower than that of Ti$_2$AlN, while MCS of the as-annealed samples are all higher than that of Ti$_2$AlN, wherein the MCS of the samples annealed at 1200° C. and 1300° C. are very close to that of Al$_2$O$_3$. This demonstrates that the high-temperature strength of HP sample can be effectively improved by annealing treatment, and the high-temperature strengths of the samples annealed at 1200° C. and 1300° C. are close to that of Al$_2$O$_3$.

Figure 13:
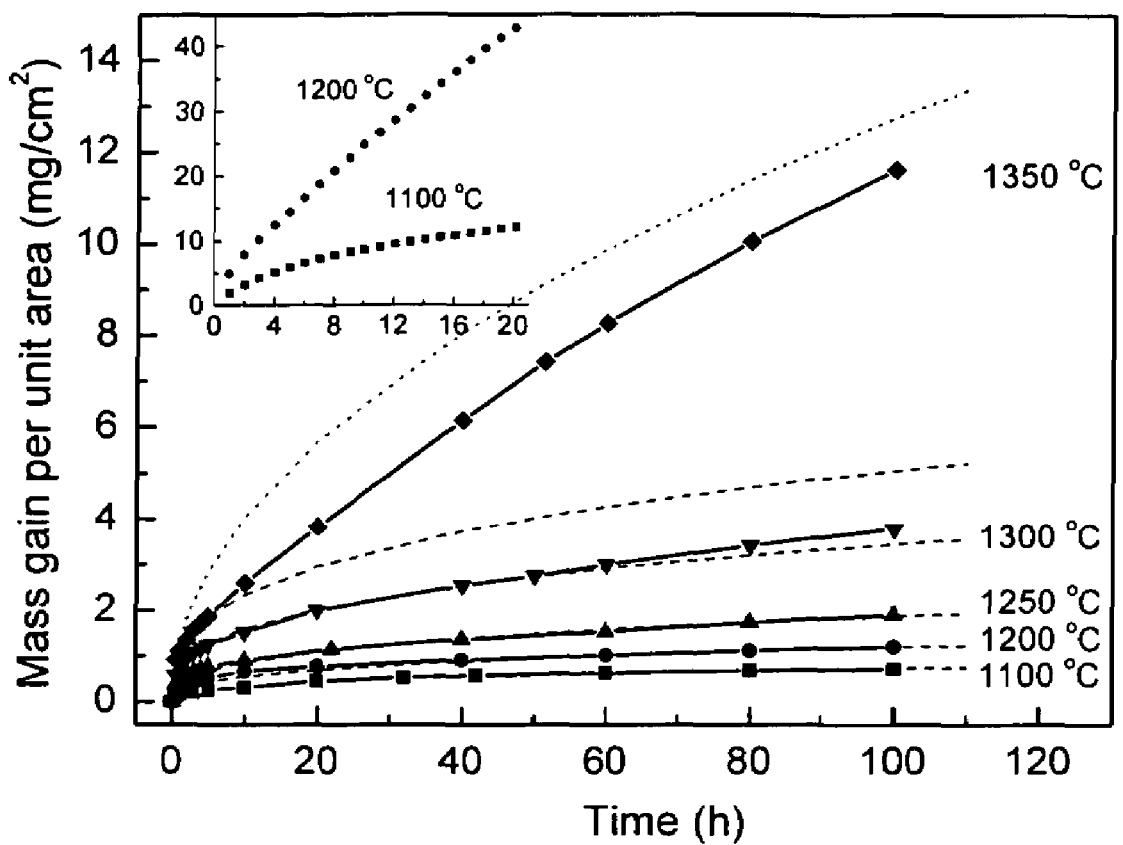
FIG. 13 shows a graph of variation of the mass gain per unit area at 1100° C. to 1350° C. with time for the $Al_2O_3$ dispersion-strengthened $Ti_2AlN$ composite produced in Example 5, wherein the dashed lines represent fits of the corresponding experimental data of 1100° C. to 1300° C. to the cubic root law, the dotted line is a fit of the experimental data of 1350° C. to the parabolic law, and inset plots the oxidation properties of $Ti_3SiC_2$-based material.

FIG. 13 shows a graph of the variation of the mass gain per unit area at 1100° C. to 1350° C. with time of as-HPed samples of the Al$_2$O$_3$ dispersion-strengthened Ti$_2$AlN composite produced in Example 5. For oxidation at 1100° C., the mass gain per unit area (Δm/A) gradually increases before 5 h, and remains nearly stable with time increasing. For oxidation at 1200° C. and 1250° C., the mass gain per unit area still increases slowly with time. The mass gains per unit area at 1100° C./100 h, 1200° C./100 h, 1250° C./100 h are 0.72 mg/cm$^2$ 1.2 mg/cm$^2$ and 1.9 mg/cm$^2$, respectively. For oxidation at 1300° C., the mass gain per unit area gradually increases before 5 h, and still increases slowly with time. For oxidation at 1350° C., the mass gain per unit area increases slowly before 5 h; after 5 h, the mass gain per unit area increases faster with time than that of samples oxidized at low temperatures. The mass gains per unit area at 1300° C./100 h, and 1350° C./100 h are 3.79 mg/cm$^2$ and 11.6 mg/cm$^2$, respectively. Compared with results of Sun et al. Z. M. Sun, Y. C. Zhou. M. S. Li, Acta Mater., 49, 4347(2001)), the mass gain per unit area of the as-HPed composite oxidized at 1100° C./20 h is only 3.7% that of Ti$_3$SiC$_2$-based material; and the mass gain per unit area of the as-HPed composite at 1200° C./20 h is only 1.8% that of Ti$_3$SiC$_2$-based material. Barsoum et al. ((M. W. Barsoum, N. Tzenov, A. Procopio, T. El-Raghy, M. Ali, J. Electrochem. Soc., 148, C551 (2001)) reported that the oxidation experimental results of the TiAlX phases are:

oxidation follows the parabolic law in the range of 1000° C. to 1100° C., for time shorter than 20 h; while for time longer than 20 h, the oxidation follows the linear law, which indicates the materials do not resist the oxidation, and it is thought that the oxidation resistance of TiAlX phases was not as good as that of $Ti_3SiC_2$. The oxidation properties of $Ti_3SiC_2$ were improved by adding Al to form solid solution by Zhang et al. (H. B. Zhang, Y. C. Zhou, Y. W. Bao, M. S. Li, Acta Mater., 52, 3631 (2004)). The mass gains per unit area of the as-HPed composite oxidized at 1100° C. to 1300° C. for 20 h are comparable to that of Zhang'results. But the mass gain per unit area of the as-HPed composite oxidized at 1350° C. for 20 h is 3.8 mg/cm$^{2,}$ 5% of Zhang's result (80 mg/cm$^2$). Even, the mass gain per unit area of the as-HPed composite oxidized at 1350° C. for 100 h is 11.6 mg/cm$^2$, significantly smaller than that of Zhang's sample oxidized at 1350° C. for 20 h. It can be seen that, compared with the oxidation resistance of the TiAlX phases, the as-HPed composites exhibit excellent oxidation resistance in the range of 1100° C. to 1350° C. for long time (100 h), which demonstrates the significant improvement of high temperature oxidation properties by the in situ formation of $Al_2O_3$.

Figure 14:
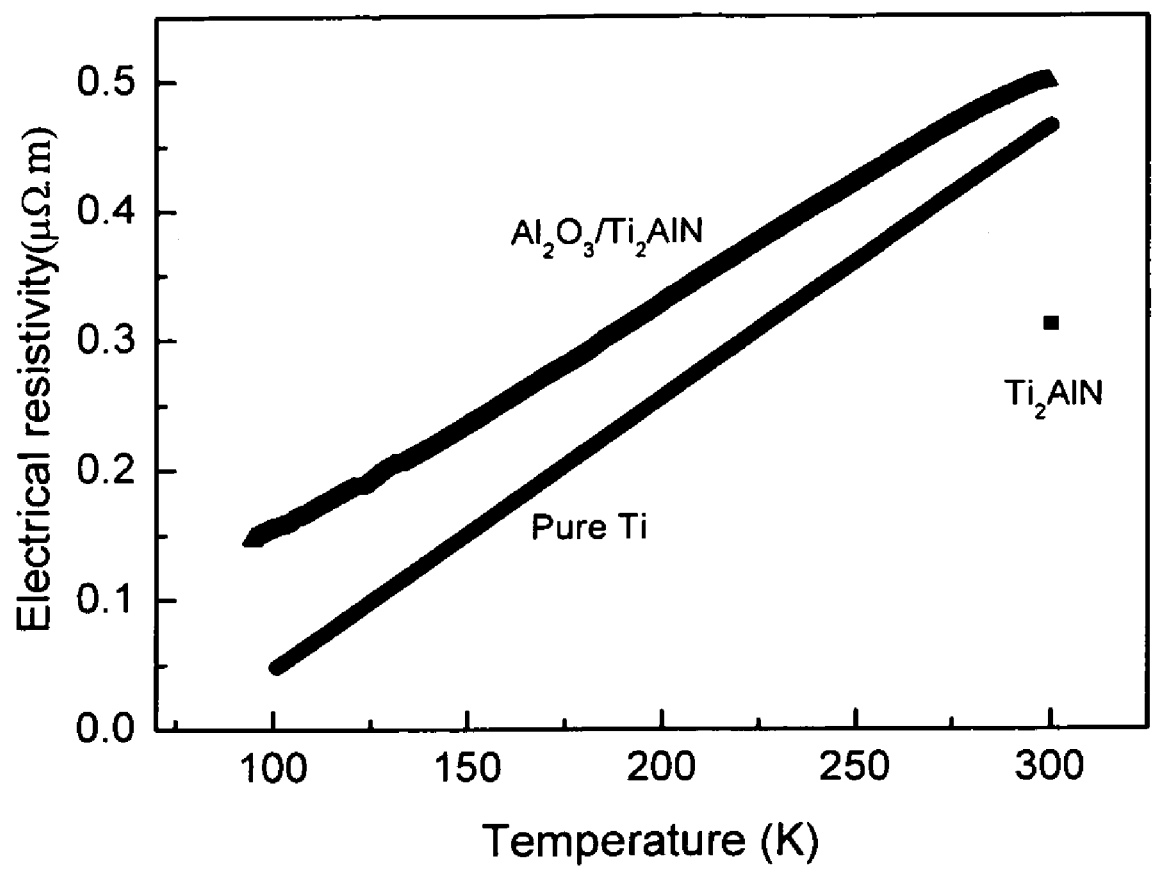
FIG. 14 shows a graph of variation of the electrical resistivity with temperature for the $Al_2O_3$ dispersion-strengthened $Ti_2AlN$ composite produced in Example 5.

FIG. 14 shows a graph of the variation of the electrical resistivity with temperature of the $Al_2O_3$ dispersion-strengthened $Ti_2AlN$ composite produced in Example 5. It can be seen that, the electrical resistivity of the $Al_2O_3/Ti_2AlN$ composite decreases linearly with temperature from 300 K to 100 K. By a linear fit of the experimental data, the expression of electrical resistivity (ρ) and temperature (T) can be obtained.

$$\rho(T)=0.49945\times[1+0.00356\times(T-300)] T>100K$$

The temperature coefficient of the resistivity of the composite is 0.00356 K$^{-1}$. The electrical resistivity of the $Al_2O_3/Ti_2AlN$ composite at room temperature is 0.49945 μΩ·m. The electrical resistivity for $Ti_2AlN$ at room temperature is 0.312 μΩ·m, and for pure Ti is in the range of 0.40 μΩ·m to 0.492 μΩ·m. It is seen that the electrical resistivity of the $Al_2O_3/Ti_2AlN$ composite is a little higher than that of $Ti_2AlN$, and comparable to that of pure Ti. This indicates the as-prepared composites with the excellent conductivity; meanwhile it effectively demonstrates the composites with good microstructure.

The $Al_2O_3$ dispersion-strengthened $Ti_2AlN$ composites and the production method thereof provided by the invention possess the following merits:

The $Al_2O_3/Ti_2AlN$ composites were prepared with nanopowders (mean particle size of 42 nm) by HPMR. The $Ti_2AlN$ matrix and $Al_2O_3$ strengthening phase are both reactively formed in situ. $Al_2O_3$ particles are equiaxed crystals, and particle size of $Al_2O_3$ distributes in the range of 500 nm and 2 μm, the mean size of $Al_2O_3$ particles is about 0.8 μm to 1.2 μm. The grains of $Ti_2AlN$ are plate-shaped, about 80 nm to 120 nm thick and 0.5 μm to 2 μm long.

The microhardness of the $Al_2O_3$ dispersion-strengthened $Ti_2AlN$ composites is 7 GPa to 12 GPa, 1.8 to 3 times that of $Ti_2AlN$. In situ formed $Al_2O_3$ significantly improves the hardness of the composite. The compressive strength of the composites at room temperature is comparable to that of $Al_2O_3$, while the high-temperature strength falls between that of the coarse-grained $Al_2O_3$ and $Ti_2AlN$. The excellent high-temperature deformability of the composites under both compression and flexure stresses is achieved at relatively low temperature and relatively rapid strain rate, which is important for the hot workability of the composites.

Compared with the oxidation resistance of TiAlX phases, the as-HPed samples of the $Al_2O_3$ dispersion-strengthened $Ti_2AlN$ composites exhibit excellent oxidation resistance in the range of 1100° C. to 1350° C. for long time (100 h), which demonstrates that the high temperature oxidation resistance properties of the composites are greatly improved by in situ formation of $Al_2O_3$.

The electrical resistivity graph of the $Al_2O_3$ dispersion-strengthened $Ti_2AlN$ composites shows metallic characteristics. The electrical resistivity of the composites at room temperature is 0.3 μΩ·m to 0.8 μΩ·m, which is a little higher than that of $Ti_2AlN$, and comparable to that of pure Ti.

The hot pressing temperature of the $Al_2O_3/Ti_2AlN$ composites bulk is lower by 200° C. to 500° C. than that of $Ti_2AlN$ by hot isostatic pressing using micron-scale powder, and synthesis time is shorter by 20 hours to 40 hours. Thus, a lot of energy can be saved.

EXAMPLE 1

First, TiN nanopowders were prepared by HPMR continuously supplied with Ti rods. The chamber atmosphere is the mixture gas with a total pressure of 1 atm of $N_2$, $H_2$ and Ar, with 10% (by volume) $N_2$, and the $H_2$ to Ar ratio of 1:1 by volume. Al nanopowders were prepared by HPMR continuously supplied with Al rods. The chamber atmosphere is the mixture gas with a total pressure of 1 atm of $H_2$ and Ar, with $H_2$ and Ar ratio of 1:1 by volume. When Al rods were changed to Ti rods, Ti nanopowders were obtained by using the same process as that for Al nanopowders. The procedures of HPMR are: Samples were taken as anode, and tungsten electrode as cathode; when vacuum of the chamber reached to 3×10$^{-3}$ Pa, Ar, $H_2$ and $N_2$ were charged at a given ratio; after a stable arc was established between the cathode and anode, the electrical current was stabled at about 200 A, and voltage was stabled at about 30 V; after every 0.5 h, $N_2$ was supplied to keep the total pressure at about 1 atm; and after working for 4 to 6 h, the arc power was turned off; once nanopowders deposited in the collecting chamber, the nanopowders were collected in a glove case with vacuum of 3×10$^{-3}$ Pa. For an atmosphere of the mixture of $H_2$ and Ar, the supply of $N_2$ was omitted, while other operations were the same as those for the nitrogen atmosphere.

The powders were mixed according to the following expression:

$$Ti+Al+TiN \rightarrow Ti_2AlN$$

Second, TiN nanopowder 12.4 g in weight, Al nanopowders 5.4 g in weight and Ti nanopwders 9.6 g in weight were measured. After homogeneously mixing, the mixture powders were placed in a graphite mold of φ50×60. The mold was placed in a hot pressing furnace. After the hot pressing furnace was vacuumed, the mixture powders were heated to a predetermined temperature of 850° C. After temperature reached to 850° C., a pressure of 45 MPa was applied. The temperature and pressure were kept constant for 4.5 h. After hot pressing, a sample 3.5 mm thick was obtained.

The as-produced material was $Ti_2AlN$ bulk, with Vickers hardness of about 4.5 GPa. Compressive strength at room temperature is 450 MPa, and electrical resistivity at room temperature is 0.30 μΩ·m.

EXAMPLE 2

First, TiN nanopowders were prepared by HPMR continuously supplied with Ti rods. The chamber atmosphere is the mixture gas with a total pressure of 1 atm of $N_2$, $H_2$ and Ar, with 12% (by volume) $N_2$, and the $H_2$ to Ar ratio of 1:0.9 by volume. Al nanopowders were prepared by HPMR continuously supplied with Al rods. The chamber atmosphere is the mixture gas with a total pressure of 1 atm of $H_2$ and Ar, with $H_2$ and Ar ratio of 1:0.9 by volume. When Al rods were changed to Ti rods, Ti nanopowders were obtained by using the same process as that for Al nanopowders. After Ti and Al nanopowders were subjected to surface passivation treatments, oxygen content of Ti nanopowders and Al nanopowders is about 5% and about 8% by weight, respectively. The procedures of HPMR are: Samples were taken as anode, and tungsten electrode as cathode; when vacuum of the chamber reached to $3\times10^{-3}$ Pa, Ar, $H_2$ and $N_2$ were charged at a given ratio; after a stable arc was established between the cathode and anode, the electrical current was stabled at about 200 A, and voltage was stabled at about 30 V; after every 0.5 h, $N_2$ was supplied to keep the total pressure at about 1 atm; and after working for 4 to 6 h, the arc power was turned off, and Ar gas was charged to 0.8 atm; the nanopowders flowed rapidly under the work of gas-circulated pump; during this process, air was slowly charged and reached to 1 atm; then input valve was turned off, and gas-circulated pump continuously worked for 0.5 h and was turned off; once nanopowders deposited in the collecting chamber, the nanopowders were collected in a glove case with vacuum of $3\times10^{-3}$ Pa. For an atmosphere of the mixture of $H_2$ and Ar, the supply of $N_2$ was omitted, while other operations were the same as those for the nitrogen atmosphere.

The powders were mixed according to the following expression:

$$4Ti+6Al+4TiN+3O \rightarrow 4Ti_2AlN+Al_2O_3$$

Second, TiN nanopowder 12.4 g in weight, Al nanopowders 8.1 g in weight and Ti nanopwders 9.6 g in weight were measured. After homogeneously mixing, the mixture powders were placed in the graphite mold of $\phi 50\times 60$. The mold was placed in the hot pressing furnace. After the hot pressing furnace was vacuumed, the mixture powders were heated to a predetermined temperature of 900° C. After temperature reached to 900° C., the pressure of 55 MPa was applied. The temperature and pressure were kept constant for 5.5 h. After hot pressing, sample 3.60 mm thick was obtained.

The as-produced material is $Al_2O_3/Ti_2AlN$ composite bulk, with about 20% (by volume) $Al_2O_3$. Vickers hardness of the composite is about 7 GPa. Compressive strength at room temperature is 1200 MPa, and electrical resistivity at room temperature is 0.35 $\mu\Omega\cdot m$. Microstructure of as-HPed sample is the same as that of the composite with 40% (by volume) $Al_2O_3$ described in MODE OF CARRYING OUT THE INVENTION section. Table 2 shows the compressive strength of as-HPed samples at different temperature, with initial strain rate of $3\times10^{-3}$/s. Table 3 shows the compressive strength of as-annealed samples tested at 1100° C., with initial strain rate of $3\times10^{-3}$/s. Table 4 displays the mass gain per unit area of as-HPed samples oxidized at different temperature for 100 h.

TABLE 2

The compressive strength of the as-HPed samples at different temperature

| Test temperature (° C.) | Compressive strength (MPa) |
|---|---|
| Room temperature | 1200 |
| 850 | 850 |
| 950 | 600 |
| 1050 | 300 |
| 1100 | 160 |
| 1150 | 30 |

TABLE 3

The compressive strength of the as-annealed samples tested at 1100° C.

| Heat treatment parameters | Compressive strength at 1100° C. (MPa) |
|---|---|
| 1100° C./20 h air cooling | 350 |
| 1200° C./20 h air cooling | 500 |
| 1250° C./20 h air cooling | 450 |
| 1300° C./20 h air cooling | 460 |
| 1350° C./20 h air cooling | 400 |

TABLE 4

The mass gain per unit area of the as-HPed samples oxidized at different temperature for 100 h

| Oxidation temperature (° C.) | Mass gain per unit area for 100 h (mg/cm$^2$) |
|---|---|
| 1100 | 0.9 |
| 1200 | 1.4 |
| 1250 | 2.2 |
| 1300 | 4.1 |
| 1350 | 14.5 |

EXAMPLE 3

First, TiN nanopowders were prepared by HPMR continuously supplied with Ti rods. The chamber atmosphere is the mixture gas of $N_2$, $H_2$ and Ar, with a total pressure of 1 atm with 13% (by volume) $N_2$, and $H_2$ to Ar ratio of 1:0.8 by volume. Al nanopowders were prepared by HPMR continuously supplied with Al rods. The chamber atmosphere is the mixture gas of $H_2$ and Ar with a total pressure of 1 atm, with $H_2$ to Ar ratio of 1:0.8 by volume. When Al rods were changed to Ti rods, Ti nanopowders were obtained by using the same process as that for Al nanopowders. After Ti and Al nanopowders were subjected to surface passivation treatments, oxygen contents of Ti nanopowders and Al nanopowders are about 6% and about 10% by weight, respectively. The procedures of HPMR are: Samples were taken as anode, and tungsten electrode as cathode; when vacuum of the chamber reached to $3\times10^{-3}$ Pa, Ar, $H_2$ and $N_2$ were charged at a given ratio; after a stable arc was established between the cathode and anode, the electrical current was stabled at about 200 A, and voltage was stabled at about 30 V; after every 0.5 h, $N_2$ was supplied to keep the total pressure at about 1 atm; and after working for 4 to 6 h, the arc power was turned off, and Ar gas was charged to 0.75 atm; the nanopowders flowed rapidly under the work of gas-circulated pump; during this process, air was slowly charged and reached to 1 atm; then input valve was turned off, and gas-circulated pump continuously worked for 0.5 h and was turned off; once nanopowders deposited in the collecting chamber, the nanopowders were collected in a glove case with vacuum of $3\times10^{-3}$ Pa. For an atmosphere of the mixture of $H_2$ and Ar, the supply of $N_2$ was omitted, while other operations were the same as those for the nitrogen atmosphere.

The powders were mixed according to the following expression:

$$7Ti+13Al+7TiN+9O \rightarrow 7Ti_2AlN+3Al_2O_3$$

Second, TiN nanopowder 13 g in weight, Al nanopowders 10.5 g in weight and Ti nanopwders 10 g in weight were measured. After homogeneously mixing, the mixture powders were placed in the graphite mold of $\phi 50\times 60$. The mold was placed in the hot pressing furnace. After the hot pressing furnace was vacuumed, the mixture powders were heated to a predetermined temperature of 950° C. After temperature reached to 950° C., the pressure of 60 MPa was applied. The temperature and pressure were kept constant for 4 h. After hot pressing, sample 4.00 mm thick was obtained.

The as-produced material is $Al_2O_3/Ti_2AlN$ composite bulk, with about 30% (by volume) $Al_2O_3$. Vickers hardness of the composite is about 8 GPa. Compressive strength at room temperature is 1400 MPa, and electrical resistivity at room temperature is 0.40 $\mu\Omega\cdot m$. Microstructure of as-HPed sample is the same as that of the composite with 40% (by volume) $Al_2O_3$ described in MODE OF CARRYING OUT THE INVENTION section. Table 5 shows the compressive strength of as-HPed sample at different temperature, with initial strain rate of $3\times10^{-3}$/s. Table 6 shows the compressive strength of as-annealed samples tested at 1100° C., with initial strain rate of $3\times10^{-3}$/s. Table 7 displays the mass gain per unit area of as-HPed samples oxidized at different temperature 100 h.

TABLE 5

Compressive strength of as-HPed samples at different temperature

| Test temperature (° C.) | Compressive strength (MPa) |
|---|---|
| Room temperature | 1400 |
| 850 | 900 |
| 950 | 650 |
| 1050 | 350 |
| 1100 | 240 |
| 1150 | 50 |

TABLE 6

Compressive strength of as-annealed samples tested at 1100° C.

| Heat treatment parameters | Compressive strength at 1100° C. (MPa) |
|---|---|
| 1100° C./20 h air cooling | 400 |
| 1200° C./20 h air cooling | 530 |
| 1250° C./20 h air cooling | 450 |
| 1300° C./20 h air cooling | 480 |
| 1350° C./20 h air cooling | 410 |

TABLE 7

The mass gain per unit area of as-HPed samples oxidized at different temperature for 100 h

| Oxidation temperature (° C.) | Mass gain per unit area for 100 h (mg/cm$^2$) |
|---|---|
| 1100 | 0.80 |
| 1200 | 1.30 |
| 1250 | 2.10 |
| 1300 | 3.92 |
| 1350 | 12.6 |

EXAMPLE 4

The single-phase nanopowders were used in the former Example 1 to 3, while in situ mixture nanopowders were obtained by using alloy master in Example 4 to 5. First, mixture nanopowers were prepared by HPMR continuously supplied with Ti—Al alloy rods with Al content 40% by atom. The chamber atmosphere is the mixture gas of $N_2$, $H_2$ and Ar with a total pressure of 1 atm, with 13% (by volume) $N_2$, and the $H_2$ to Ar ratio of 1:0.8 by volume. The mixture nanopowders consist of TiN, TiAl and Al phases, and oxygen content of mixture nanopowders is about 12% by weight. The procedures of HPMR include: Samples were taken as anode, and tungsten electrode as cathode; when vacuum of the chamber reached to $3\times10^{31\,3}$ Pa, Ar, $H_2$ and $N_2$ were charged at a given ratio; after a stable arc was established between the cathode and anode, the electrical current was stabled at about 200 A, and voltage was stabled at about 30 V; after every 0.5 h, $N_2$ was supplied to keep the total pressure at about 1 atm; after working for 4 to 6 h, the arc power was turned off, and Ar gas was charged to 0.75 atm; the nanopowders flowed rapidly under the work of gas-circulated pump; during this process, air was slowly charged and reached to 1 atm; then input valve was turned off, and gas-circulated pump continuously worked for 0.5 h and was turned off; once nanopowders deposited in the collecting chamber, the nanopowders were collected in a glove case with vacuum of $3\times10^{-3}$ Pa.

The powders were mixed according to the following expression:

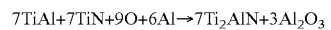

$$7TiAl + 7TiN + 9O + 6Al \rightarrow 7Ti_2AlN + 3Al_2O_3$$

Second, mixture nanopowders 40 g in weight were measured. After homogeneous mixing, the mixture powders were placed in a graphite mold of $\phi 50\times 60$. The mold was placed in a hot pressing furnace. After the hot pressing furnace was vacuumed, the mixture powders were heated to the predetermined temperature of 950° C. After temperature reached to 950° C., the pressure of 60 MPa was applied. Temperature and pressure were kept constant for 5 h. After hot pressing, sample 4.9 mm thick was obtained.

The as-produced material is $Al_2O_3/Ti_2AlN$ composite bulk, with 30% (by volume) $Al_2O_3$. Vickers hardness of the composite is about 8.2 GPa. Compressive strength at room temperature is 1400 MPa, and electrical resistivity at room temperature is 0.41 $\mu\Omega\cdot m$. Microstructure of as-HPed sample is the same as that of the composite with 40% (by volume) $Al_2O_3$ described in MODE OF CARRYING OUT THE INVENTION section. Mechanical and oxidation properties at different temperature are nearly the same as those of Example 3.

EXAMPLE 5

First, mixture nanopowders were prepared by HPMR continuously supplied with Ti—Al alloy rods with Al content 50% by atom. The chamber atmosphere is the mixture gas of $N_2$, $H_2$ and Ar with a total pressure of 1 atm, with 14% (by volume) $N_2$, and the $H_2$ to Ar ratio of 1:0.9 by volume. The mixture nanopowders comprise TiN, and $TiAl_3$ phases, with TiN and $TiAl_3$ mol ratio of 1:0.9, and oxygen content of mixture nanopowders is about 15% by weight. The procedures of HPMR are: Samples were taken as anode, and tungsten electrode as cathode; when vacuum of the chamber reached to $3\times10^{-3}$ Pa, Ar, $H_2$ and $N_2$ were charged at a given ratio; after a stable arc was established between the cathode and anode, the electrical current was stabled at about 200 A, and voltage was stabled at about 30 V; after every 0.5 h, $N_2$ was supplied to keep the total pressure at about 1 atm; after working for 4 to 6 h, the arc power was turned off, and Ar gas was charged to 0.7 atm; the nanopowders flowed rapidly under the work of gas-circulated pump; during this process, air was slowly charged and reached to 1 atm; then input valve was turned off, and gas-circulated pump continuosly worked for 0.5 h and was turned off; once nanopowder deposited in the collecting chamber, the nanopowders were collected in a glove case with vaccume of $3\times10^{-3}$ Pa.

The powders were mixed according to the following expression:

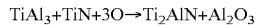

Second, mixture nanopowders 26 g in weight were measured. After homogeneous mixing, the mixture powders were placed in a graphite mold 50 mm in diameter and 60 mm in height. The graphite mold was placed in a hot pressing furnace. After the hot pressing furnace was vacuumed, the mixture powders were heated to the predetermined temperature of 1000° C. After temperature reached 1000° C., the pressure of 50 MPa was applied. Temperature and pressure were kept constant for 5 h. After hot pressing, sample 3.28 mm thick was obtained.

The as-produced material is bulk $Al_2O_3/Ti_2AlN$ composite, with 40% (by volume) $Al_2O_3$. Vickers hardness of the composite is about 10 GPa. Compressive strength at room temperature is 1800 MPa, and electrical resistivity at room temperature is 0.50 μΩ·m. Microstructural characteristics, mechanical and oxidation properties, were described in MODE OF CARRYING OUT THE INVENTION section. Table 8 shows the compressive strength of as-HPed samples at different temperature, with the initial strain rate of $3\times10^{-3}$/s. Table 9 shows the compressive strength of as-annealed samples tested at 1100° C., with the initial strain rate of $3\times10^{-3}$/s. Table 10 displays the mass gain per unit area of as-HPed samples oxidized at different temperature for 100 h.

TABLE 8

Compressive strength of as-HPed samples at different temperature

| Test temperature (° C.) | Compressive strength (MPa) |
| --- | --- |
| Room temperature | 1870 |
| 850 | 1050 |
| 950 | 720 |
| 1050 | 420 |
| 1100 | 260 |
| 1150 | 40 |

TABLE 9

Compressive strength of as-annealed samples tested at 1100° C.

| Heat treatment parameters | Compressive strength at 1100° C. (MPa) |
| --- | --- |
| 1100° C./20 h air cooling | 445 |
| 1200° C./20 h air cooling | 586 |
| 1250° C./20 h air cooling | 460 |
| 1300° C./20 h air cooling | 573 |
| 1350° C./20 h air cooling | 440 |

TABLE 10

The mass gain per unit area of as-HPed samples after oxidized at different temperature for 100 h

| Oxidation temperature (° C.) | Mass gain per unit area for 100 h (mg/cm$^2$) |
| --- | --- |
| 1100 | 0.72 |
| 1200 | 1.20 |
| 1250 | 1.90 |
| 1300 | 3.79 |
| 1350 | 11.60 |

We claim:

1. $Al_2O_3$ dispersion-strengthened $Ti_2AlN$ composites comprising $Ti_2AlN$ matrix and $Al_2O_3$ strengthening phase, with $Al_2O_3$ particles dispersed uniformly in the $Ti_2AlN$ matrix, characterized in that $Ti_2AlN$ matrix and $Al_2O_3$ strengthening phase both are produced by in situ reactive process.

2. The $Al_2O_3$ dispersion-strengthened $Ti_2AlN$ composites of claim 1 wherein the volume fraction of $Al_2O_3$ is 5% to 50%.

3. The $Al_2O_3$ dispersion-strengthened $Ti_2AlN$ composites of claim 1 wherein the shape of $Al_2O_3$ particles is equiaxed, and particle size of $Al_2O_3$ distributes in the range of 500 nm to 2 μm, with the mean size of 0.8 μm to 1.2 μm; the shape of $Ti_2AlN$ grain is plate-like, 80 nm to 120 nm thick and 0.5 μm to 2 μm long, and with an average geometric size of 0.2 μm to 0.5 μm, wherein the average geometric size means a value obtained by extracting a square root of a product of the length and width.

4. A method for preparing $Al_2O_3$ dispersion-strengthened $Ti_2AlN$ composites according to claim 1, comprising:
preparing nanopowders of Ti—Al system by a hydrogen plasma-metal reaction method, and compacting the nanopowders by vacuum hot pressing or hot isostatic pressing.

5. The method for preparing $Al_2O_3$ dispersion-strengthened $Ti_2AlN$ composites of claim 4 wherein the method is carried out in is a mixture atmosphere of nitrogen-containing gas, $H_2$, and Ar with a pressure of 0.8 to 1.2 atm.

6. The method for preparing $Al_2O_3$ dispersion-strengthened $Ti_2AlN$ composites of claim 4 wherein the nanopowders of Ti—Al system are prepared with Ti—Al master alloys, wherein the Ti—Al master alloys selected from the group consisting of Ti—Al alloy rods with Al content of 20% to 60% by atom, and pure Al rods and pure Ti rods, in a manner of continual feeding.

7. The method for preparing $Al_2O_3$ dispersion-strengthened $Ti_2AlN$ composites of claim 4 wherein the nanopowders of Ti—Al system are selected from the group consisting of pure element nanopowders of Ti and Al, alloy nanopowders with Ti and Al elements, and ceramic nanopowders with Ti, Al, O, and N elements.

8. The method for preparing $Al_2O_3$ dispersion-strengthened $Al_2O_3$ composites of claim 4 wherein the oxygen content of the nanopowders of Ti—Al system is 0 to 20% by weight.

9. The method for preparing $Al_2O_3$ dispersion-strengthened $Ti_2AlN$ composites of claim 4 wherein the parameters of the vacuum hot pressing are: temperature of 800° C. to 1200° C.; pressure of 40 MPa to 60 MPa; time of 4 h to 6 h; and vacuum of $2\times10^{-2}$ Pa to $5\times10^{-3}$ Pa.

10. The method for preparing $Al_2O_3$ dispersion-strengthened $Ti_2AlN$ composites of claim 4 wherein the nitrogen-containing gas is $N_2$ or $NH_3$ gas, with a volume fraction of 0 to 20%.

11. The method for preparing $Al_2O_3$ dispersion-strengthened $Ti_2AlN$ composites of claim 4 wherein the nanoparticles of Ti—Al system are selected from the group consisting of Ti, TiN, intermetallic compounds of Ti—Al system, Al, and AlN.

* * * * *

UNITED STATES PATENT AND TRADEMARK OFFICE
CERTIFICATE OF CORRECTION

PATENT NO. : 7,459,408 B2
APPLICATION NO. : 11/629559
DATED : December 2, 2008
INVENTOR(S) : Li et al.

It is certified that error appears in the above-identified patent and that said Letters Patent is hereby corrected as shown below:

Page 1, Item (54) (Title), Line 1 and Column 1, Lines 1-2 - Please delete "AL$_2$O$_3$" and insert therefore, --Al$_2$O$_3$--.

Page 1, Item (54) (Title), Line 2 - Please delete "TI$_2$ALN" and insert therefore, --Ti$_2$AlN--.

Column 1, Page 2, Item (56), Line 21 - Under Other Publications, please delete "Ti-Al-C"" and insert therefore, --Ti-Al-C"--.

Column 1, Page 2, Item (56), Line 24-25 - Under Other Publications, please delete "Ti-Al-N"," and insert therefore, --Ti-Al-N",--.

Column 2, Page 2, Item (56), Line 19 - Under Other Publications, please delete "for" and insert therefore, --of--.

Sheet 9, (Y axis) Fig. 12 - Please delete "compresive" and insert therefore, --compressive--.

Sheet 9, Fig. 12 - Please delete "As-HPed" and insert therefore, --as-HPed--.

Column 1, Line 1 - Please delete "AL$_2$O$_3$" and insert therefore, --Al$_2$O$_3$--.

Column 1, Line 2 - Please delete "TI$_2$ALN" and insert therefore, --Ti$_2$AlN--.

Column 1, Line 4 - Below Title, please insert --Cross-Reference To Related Applications--.

Column 3, Line 24 - Please delete "source In" and insert therefore, --source. In--.

Column 3, Line 28 - Please delete "Appl." and insert therefore, --Appl.--.

Column 8, Line 30 - Please delete "3×10-3/s." and insert therefore, --$3 \times 10^{-3}/s$--.

Column 8, Line 59 - Please delete "al." and insert therefore, --al. (--.

Column 8, Line 60 - Please delete "Zhou." and insert therefore, --Zhou,--.

UNITED STATES PATENT AND TRADEMARK OFFICE
CERTIFICATE OF CORRECTION

PATENT NO. : 7,459,408 B2
APPLICATION NO. : 11/629559
DATED : December 2, 2008
INVENTOR(S) : Li et al.

It is certified that error appears in the above-identified patent and that said Letters Patent is hereby corrected as shown below:

Column 9, Line 11 - Please delete "Zhang'results." and insert therefore, --Zhang's results.--.

Column 10, Line 46 - Please delete "nanopwders" and insert therefore, --nanopowders--.

Column 11, Line 31 - Please delete "nanopwders" and insert therefore, --nanopowders--.

Column 12, Line 65 - Please delete "nanopwders" and insert therefore, --nanopowders--.

Column 13, Line 15 - Please delete "sample" and insert therefore, --samples--.

Column 13, Line 20 - Please delete "100 h." and insert therefore, --for 100 h.--.

Column 13, Line 64 - Please delete "nanopowers" and insert therefore, --nanopowders--.

Column 14, Line 6 - Please delete "$3 \times 10^{31\ 3}$" and insert therefore, --$3 \times 10^{-3}$--.

Column 14, Line 64 - Please delete "continuosly" and insert therefore, --continuously--.

Column 14, Line 65 - Please delete "nanopowder" and insert therefore, --nanopowders--.

Column 14, Line 67 - Please delete "vaccume" and insert therefore, --vacuum--.

Column 16, Line 28 - In Claim 5, please delete "in is a" and insert therefore, --in a--.

UNITED STATES PATENT AND TRADEMARK OFFICE
CERTIFICATE OF CORRECTION

PATENT NO. : 7,459,408 B2
APPLICATION NO. : 11/629559
DATED : December 2, 2008
INVENTOR(S) : Li et al.

It is certified that error appears in the above-identified patent and that said Letters Patent is hereby corrected as shown below:

Column 16, Line 46 - In Claim 8, please delete "$Al_2O_3$" and insert therefore, --$Ti_2AlN$--.

Signed and Sealed this

Twenty-seventh Day of October, 2009

David J. Kappos
*Director of the United States Patent and Trademark Office*